United States Patent
Yoshikawa et al.

(10) Patent No.: US 12,540,252 B2
(45) Date of Patent: Feb. 3, 2026

(54) ACTIVE ENERGY RAY-CURABLE INKJET INK, AND PRINTED MATTER

(71) Applicants: artience Co., Ltd., Tokyo (JP); TOYOCOLOR CO., LTD., Tokyo (JP)

(72) Inventors: Takumi Yoshikawa, Tokyo (JP); Gosuke Kikutsuji, Tokyo (JP)

(73) Assignees: Artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 251 days.

(21) Appl. No.: 18/279,516

(22) PCT Filed: Oct. 3, 2022

(86) PCT No.: PCT/JP2022/036933
§ 371 (c)(1),
(2) Date: Aug. 30, 2023

(87) PCT Pub. No.: WO2023/095448
PCT Pub. Date: Jun. 1, 2023

(65) Prior Publication Data
US 2024/0166902 A1 May 23, 2024

(30) Foreign Application Priority Data
Nov. 29, 2021 (JP) .................. 2021-192636

(51) Int. Cl.
*C09D 11/322* (2014.01)
*B41J 2/01* (2006.01)
(Continued)

(52) U.S. Cl.
CPC .......... *C09D 11/322* (2013.01); *B41J 2/01* (2013.01); *B41J 2/2107* (2013.01); *B41M 5/00* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047;
(Continued)

(56) References Cited

U.S. PATENT DOCUMENTS 8,646,901 B2 2/2014 De Meutter et al.
10,526,499 B2 1/2020 Saito
(Continued)

FOREIGN PATENT DOCUMENTS

JP 58-52361 A 3/1983
JP 2000-119544 A 4/2000
(Continued)

OTHER PUBLICATIONS

Extended European Search Report issued Feb. 24, 2025 in Application No. 22898233.6.
(Continued)

*Primary Examiner* — Manish S Shah
(74) *Attorney, Agent, or Firm* — Sughrue Mion, PLLC

(57) ABSTRACT

Provided is an active energy ray-curable inkjet ink containing: C. I. Pigment Yellow 150; an active energy ray-polymerizable compound (A-1) including multiple ethylene oxide groups and a specific structure; an acylphosphine oxide initiator (B-1); and a siloxane surfactant (C-1) having a weight-average molecular weight of 400 to 20,000, wherein a total amount of a compound represented by general formula 2 below is 100 ppm or less. In general formula 2, $R^2$ and $R^3$ each independently represent an amino group or a hydroxyl group. General formula 2:

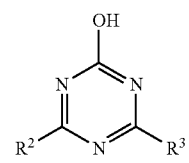

5 Claims, No Drawings

(51) Int. Cl.
    *B41J 2/21*      (2006.01)
    *B41M 5/00*     (2006.01)
    *C09D 11/101*   (2014.01)
    *C09D 11/32*    (2014.01)
    *C09D 11/38*    (2014.01)

(52) U.S. Cl.
    CPC ............ *C09D 11/101* (2013.01); *C09D 11/32* (2013.01); *C09D 11/38* (2013.01)

(58) Field of Classification Search
    CPC ........ B41M 7/00; B41M 7/0072; B41M 5/52; B41M 5/5218; B41M 5/5227
    See application file for complete search history.

(56) References Cited

U.S. PATENT DOCUMENTS

| | | | | |
|---|---|---|---|---|
| 2006/0004116 | A1* | 1/2006 | Kishi | C09D 11/101 522/146 |
| 2007/0064050 | A1* | 3/2007 | Ohkubo | C09D 11/101 347/52 |
| 2009/0136680 | A1* | 5/2009 | Kishi | C09D 11/101 522/64 |
| 2011/0001779 | A1* | 1/2011 | Kida | B41J 2/2114 347/42 |
| 2011/0242191 | A1* | 10/2011 | Mochizuki | C09D 11/101 524/502 |
| 2014/0104356 | A1 | 4/2014 | Kitade | |
| 2014/0275319 | A1 | 9/2014 | Yamada et al. | |
| 2015/0130878 | A1* | 5/2015 | Kohzuki | C09D 175/08 347/85 |
| 2018/0079921 | A1 | 3/2018 | Okamoto et al. | |
| 2019/0062580 | A1 | 2/2019 | Nakashima et al. | |
| 2019/0085190 | A1 | 3/2019 | De Meutter | |
| 2021/0214568 | A1* | 7/2021 | Konda | B41M 5/0023 |
| 2022/0119662 | A1* | 4/2022 | Retailleau | C08F 226/06 |
| 2023/0102004 | A1* | 3/2023 | Kikutsuji | C09D 11/326 522/42 |

FOREIGN PATENT DOCUMENTS

| | | |
|---|---|---|
| JP | 2006-282758 A | 10/2006 |
| JP | 2011-195694 A | 10/2011 |
| JP | 2013-053208 A | 3/2013 |
| JP | 2013-514904 A | 5/2013 |
| JP | 2014-070135 A | 4/2014 |
| JP | 2014-210871 A | 11/2014 |
| JP | 2015-168723 A | 9/2015 |
| JP | 2015-183147 A | 10/2015 |
| JP | 2017-095531 A | 6/2017 |
| JP | 2017-155190 A | 9/2017 |
| JP | 2019-089961 A | 6/2019 |
| JP | 2022-149204 A | 10/2022 |
| WO | 2012/172973 A1 | 12/2012 |
| WO | 2013/062090 A1 | 5/2013 |
| WO | 2017/145671 A1 | 8/2017 |
| WO | 2017/188003 A1 | 11/2017 |
| WO | 2020/152037 A1 | 7/2020 |

OTHER PUBLICATIONS

Japanese Office Action of JP 2022-162047 dated Feb. 28, 2023.
International Search Report of PCT/JP2022/036933 dated Dec. 20, 2022.
Written opinion of PCT/JP2022/036933 dated Dec. 20, 2022.
Communication issued Nov. 17, 2025 in EP Application No. 22898223.6.

* cited by examiner

ACTIVE ENERGY RAY-CURABLE INKJET INK, AND PRINTED MATTER

CROSS REFERENCE TO RELATED APPLICATIONS

This application is a National Stage of International Application No. PCT/JP2022/036933 filed Oct. 3, 2022, claiming priority based on Japanese Patent Application No. 2021-192636 filed Nov. 29, 2021.

TECHNICAL FIELD

Embodiments of the present invention relate to an active energy ray-curable inkjet ink, and a printed matter obtained by using the active energy ray-curable inkjet ink.

BACKGROUND ART

In the recent printing industry, digital printing, in which printing is performed without using a plate, is rapidly spreading in place of conventional plate printing such as offset printing, flexographic printing, and gravure printing. The reasons for this include that printed matters can be obtained at low cost and in a short time because plate making is not necessary, that printing devices are smaller and less expensive than conventional plate printing machines, and that uniformly printed matters can be easily obtained regardless of the skill of the person engaged in printing.

The inkjet printing method, a type of digital printing method, is superior to other digital printing methods in various aspects, such as the size and cost of printing devices, running cost during printing, ease of full-color printing, and high printing speed, and has been increasingly used in recent years, particularly for industrial printing applications.

The inkjet printing method uses a wide variety of inks, such as water type, oil type, solvent type, and active energy ray-curable type inks. Among them, in recent years, the demand for active energy ray-curable inkjet inks has been increasing more and more because they can be applied to non-absorption substrates such as plastic and glass, and because they have excellent properties such as the quickness of the drying (curing) time and the strength of printed matters.

In recent years, technological innovation in inkjet heads has advanced, and inkjet heads capable of jetting at a high frequency of 20 kHz or higher are also being sold. In addition, active energy ray-curable inkjet line printers are also being sold, in which one or more of these inkjet heads are placed side by side in such a manner that the length is equal to or greater than the width of a substrate and then the substrate conveyed below the inkjet heads is subjected to a single discharging operation to complete printing.

In the above active energy ray-curable inkjet line printers, it is necessary to sufficiently cure the active energy ray-curable inkjet ink jetted from the inkjet heads onto the substrate by a single irradiation of active energy rays emitted from an active energy ray source installed downstream of the inkjet heads. Thus, it is important to blend, with the above active energy ray-curable inkjet ink, an active energy ray-polymerizable compound that has excellent curability, and a photopolymerization initiator that effectively generates a radical or the like as the starting point of a polymerization reaction of the active energy ray-polymerizable compound due to the above active energy rays (see, e.g., Patent Documents 1 to 4).

PRIOR ART DOCUMENTS

Patent Documents

Patent Document 1: JP S 58-52361 A
Patent Document 2: JP 2000-119544 A
Patent Document 3: JP 2006-282758 A
Patent Document 4: JP 2011-195694 A

SUMMARY OF INVENTION

Problems Invention Aims to Solve

For example, acylphosphine oxide initiators are used as photopolymerization initiators to ensure curability with respect to active energy rays having various wavelengths. In addition, active energy ray-curable inkjet inks using acylphosphine oxide initiators tend to have excellent substrate adhesion.

Meanwhile, C. I. Pigment Yellow 150 is known as a yellow pigment having very strong weather resistance and is used in applications where strong weather-resistance is required, such as labels that are attached to articles used outdoors.

However, C. I. Pigment Yellow 150 is also known to be a pigment that is difficult to disperse. Dispersion stability has been conventionally ensured by inclusion of melamine in C. I. Pigment Yellow 150 (see Patent Documents 1 and 2), but this is not always sufficient, and in general, in order to ensure dispersion stability, melamine had to be added to C. I. Pigment Yellow 150 in the same amount or more.

In particular, in the case of active energy ray-curable inkjet inks, materials that can be used are greatly limited in view of improving curability and inkjet printability (e.g., discharge stability during continuous printing). This limitation becomes more pronounced when the active energy ray-curable inkjet ink is used in active energy ray-curable inkjet line printers. In fact, the present inventors blended an acylphosphine oxide initiator with an active energy ray-curable inkjet ink in which C. I. Pigment Yellow 150 was dispersed, confirmed that deterioration of the dispersion stability of the C. I. Pigment Yellow 150 (increase in particle size and/or precipitation of the C.I. Pigment Yellow 150 in the active energy ray-curable inkjet ink) occurred, and also identified further defects, such as increase in viscosity (thickening) of the active energy ray-curable inkjet ink over time even without irradiation with active energy rays, and deterioration of discharge stability.

The dispersion stability, viscosity stability (suppression of the increase in viscosity over time), and discharge stability were conventionally achieved by performing actions such as using a pigment dispersing resin having a specific structure as described in Patent Document 3 and using a pigment derivative (dispersion aid) together as described in Patent Document 4. However, upon further investigation by the inventors, even when these measures were taken, in an active energy ray-curable inkjet ink containing C. I. Pigment Yellow 150 and an acylphosphine oxide initiator, it was found that the dispersed state of the C. I. Pigment Yellow 150 was destroyed and that the increase in viscosity over time and the deterioration in the discharge stability could occur due to the destruction of the dispersed state.

That is, there is still no active energy ray-curable inkjet ink that has excellent dispersion stability, viscosity stability, discharge stability, and the like, while containing C. I. Pigment Yellow 150 and an acylphosphine oxide initiator and having curability and substrate adhesion.

Embodiments of the present invention have been developed in light of the above circumstances and an object thereof is to provide an active energy ray-curable inkjet ink containing C. I. Pigment Yellow 150 and having excellent dispersion stability and viscosity stability as well as discharge stability, curability, and substrate adhesion, and a printed matter obtained using the active energy ray-curable inkjet ink.

Means for Solution of the Problems

As a result of intensive investigation aimed at resolving the issues described above, an active energy ray-curable inkjet ink described below was discovered to be able to address the above issues, thus completing the present invention.

In other words, one embodiment of the present invention relates to an active energy ray-curable inkjet ink containing C. I. Pigment Yellow 150, an active energy ray-polymerizable compound (A), a photopolymerization initiator (B), and a surfactant (C), wherein the active energy ray-polymerizable compound (A) contains a compound (A-1) represented by general formula 1, the photopolymerization initiator (B) contains an acylphosphine oxide initiator (B-1), the surfactant (C) contains a siloxane surfactant (C-1) having a weight-average molecular weight of 400 to 20,000, and a total amount of a compound represented by general formula 2 below contained in the active energy ray-curable inkjet ink is 100 ppm or less.

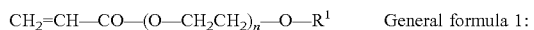

General formula 1:

In general formula 1, $R^1$ represents an acryloyl group or vinyl group, and n represents an integer of 2 to 10.

General formula 2:

[Chemical formula 1]

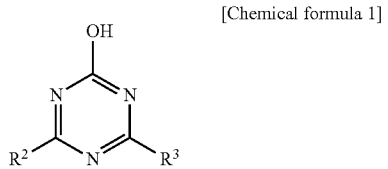

In general formula 2, $R^2$ and $R^3$ each independently represent an amino group or a hydroxyl group.

Further, another embodiment of the present invention relates to a printed matter obtained using the above-described active energy ray-curable inkjet ink.

Effects of the Invention

Embodiments of the present invention are able to provide an active energy ray-curable inkjet ink containing C. I. Pigment Yellow 150 and having high dispersion stability and viscosity stability, combined with discharge stability, curability, and substrate adhesion, and to provide a printed matter obtained using the active energy ray-curable inkjet ink.

EMBODIMENTS FOR CARRYING OUT THE INVENTION

The present invention will be described in detail below. Note that the present invention is not limited to the following embodiments and can be implemented with various modifications within a scope not deviating from the gist of the invention. Unless otherwise stated, "parts" represents "parts by mass" and "%" represents "% by mass".

As described above, in an embodiment of the present invention, an active energy ray-curable inkjet ink (hereinafter also referred to simply as "ink") contains C. I. Pigment Yellow 150, a compound (A-1) represented by the above general formula 1, an acylphosphine oxide initiator (B-1), and a siloxane surfactant (C-1) having a weight-average molecular weight of 400 to 20,000, and further, the total amount of a compound represented by the above general formula 2 is 100 ppm or less.

C. I. Pigment Yellow 150 is a yellow pigment having excellent weather resistance but is known to be very difficult to disperse. In order to improve this, the above-described measures have been proposed, but the situation was not sufficient from the viewpoint of ensuring all the properties of dispersion stability, viscosity stability, and discharge stability. Therefore, as a result of diligent investigation by the present inventors, the existence of the compound represented by the above general formula 2 was identified.

The compound represented by the general formula 2 is considered to be a hydrolysate and/or impurities of melamine included in C. I. Pigment Yellow 150. While the detailed factors are unclear, it is thought that a strong hydrogen bond is formed between a hydroxyl group present in the compound represented by general formula 2 and the C. I. Pigment Yellow 150 and thus the dispersed state of the C. I. Pigment Yellow 150 is destabilized and even destroyed. In addition, due to the destabilization and destruction of the dispersed state, the viscosity of the ink increases, and in the inkjet head, the dispersed state is destroyed and the agglomerated C.I. Pigment Yellow 150 precipitates, which is considered to be a factor in deterioration of discharge stability.

In addition, as a cause of defects such as deterioration of dispersion stability, increase in ink viscosity (thickening), and deterioration in discharge stability when the above C. I. Pigment Yellow 150 and an acylphosphine oxide initiator are used in combination, it is thought that a hydroxyl group present in the compound represented by general formula 2 interacts with a phosphine oxide moiety in the acylphosphine oxide initiator, which cleaves the acylphosphine oxide initiator and generates radicals. Thus, in an active energy ray-curable inkjet ink containing C. I. Pigment Yellow 150 and an acylphosphine oxide initiator, it is considered difficult due to the compound represented by general formula 2 to ensure dispersion stability, viscosity stability, and discharge stability, and it is considered also very difficult to realize these properties together with curability and substrate adhesion.

In response to the situation described above, in the embodiment of the present invention, by reducing the amount of the compound represented by general formula 2, it has become possible to realize dispersion stability, viscosity stability, discharge stability, curability, and substrate adhesion all together even with an active energy ray-curable inkjet ink containing the C.I. Pigment Yellow 150 and acylphosphine oxide initiator (B-1). However, by simply reducing the amount of the compound represented by general formula 2 present in the ink, it is not possible to completely suppress the adverse effect of the compound due to the hydrolysis reaction over time, for example.

Thus, in the embodiment of the present invention, the compound (A-1) represented by general formula 1, and the siloxane surfactant (C-1) having a weight-average molecular weight of 400 to 20,000 are used in combination to prevent the above-described issue. While the detailed reason for this is unclear, it is thought that an ethylene oxide group in the compound (A-1) represented by general formula (1) and a siloxane chain in the siloxane surfactant (C-1) interact with a triazine ring present in the compound represented by general formula 2, and a generated trace amount of the compound represented by general formula 2 is trapped. In particular, since the siloxane surfactant (C-1) used in the embodiment of the present invention has a large molecular weight, it has a form including the compound represented by general formula 2, and it is thought that the influence thereof can be suppressed. Meanwhile, the original properties of the siloxane surfactant, such as a surface tension adjustment function and a leveling ability, are also developed, and this can ensure the discharge stability as the inkjet ink and further improve the substrate adhesion.

In addition, when the C. I. Pigment Yellow 150 is dispersed in the ink while the amount of the compound represented by general formula 2 is small, the particle size distribution becomes sharper. Consequently, the transmittance of ultraviolet rays during the ink coating in printing is improved, and as a result, the UV rays reach inside the coating sufficiently to improve the substrate adhesion. In addition, since the ultraviolet rays can reach inside the coating, the acylphosphine oxide initiator (B-1) can receive sufficient energy and it becomes possible to further improve the curability. In addition, since the particle size distribution is sharp, it is also possible to achieve a further improvement in the discharge stability.

As described above, the configuration described above regarding the embodiment of the present invention is indispensable in order to obtain an active energy ray-curable inkjet ink containing C. I. Pigment Yellow 150 and an acylphosphine oxide initiator and having excellent dispersion stability and viscosity stability, as well as curability, substrate adhesion, and discharge stability.

Note that the compound represented by general formula 2 may inhibit the effect of the embodiment of the present invention, especially the improvement of the dispersion stability and discharge stability, and thus the smaller the content thereof, the more preferable. As described above, according to the embodiment of the present invention, the total amount of the compound represented by general formula 2 below contained in the active energy ray-curable inkjet ink is 100 ppm or less, more preferably 80 ppm or less, and particularly preferably 55 ppm or less. Note that as described above, the compound represented by general formula 2 may be generated, for example, over time. In such a case, the total amount of the compound represented by general formula 2 contained in the ink includes the above-described amount of the compound represented by general formula 2 that has been generated over time.

The components contained in the ink of the present invention will be described in detail below.

<C. I. Pigment Yellow 150>

C. I. Pigment Yellow 150 is a nickel complex having a monoazo skeleton.

As long as the total amount of the compound represented by general formula 2 contained in the ink is 100 ppm or less, as the C. I. Pigment Yellow 150, a synthesized product or commercial product may be used. When a synthesized product is used, there are no particular limitations on the synthesizing method, and any conventionally known method can be used. One example is a method of heating a mixture of azobarbituric acid and water, then adding a nickel salt and melamine to form a complex at high temperature, filtering the obtained product, and then drying and grinding.

In the C. I. Pigment Yellow 150 synthesized as a pigment, and the C. I. Pigment Yellow 150 commercially available as a pigment, a nickel complex of azobarbituric acid, which is C. I. Pigment Yellow 150, may be present as an inclusion compound including melamine as a guest molecule. Thus, the ink containing the C. I. Pigment Yellow 150 may contain an inclusion compound that includes C. I. Pigment Yellow 150. Such an ink contains melamine.

In addition, in order to adjust the particle size distribution and aspect ratio of C. I. Pigment Yellow 150 and to improve the dispersion stability, discharge stability, and viscosity stability, a process of mixing the above product with water and, as necessary, an organic solvent, surfactant, and the like, at a constant temperature (pigmentation process), and/or a process of extracting a product having a predetermined particle size distribution from the above product using a sieve, sedimentation separator, centrifuge, or the like (classification process) may be performed. Note that the classification process may be performed under wet or dry conditions.

In the embodiment of the present invention, the C. I. Pigment Yellow 150 used for the ink is, from the viewpoint of reducing the amount of the compound represented by general formula 2, preferably produced through a process of cleaning (cleaning process) using one or more liquids (hereinafter collectively referred to as "cleaning liquid") selected from the group consisting of water, an aqueous solution of a water-soluble inorganic compound, an aqueous solution of a water-soluble organic compound, and an organic solvent. Thereamong, it is preferable to use, as a cleaning liquid, an aqueous solution, adjusted to weak alkalinity, of a water-soluble inorganic compound and/or a water-soluble organic compound. In addition, from the viewpoint of reducing the amount of the compound represented by general formula 2, the cleaning process is preferably performed multiple times. At this time, a different cleaning liquid may be used for each cleaning process, and it is particularly preferable to use, at least once as the cleaning liquid, an aqueous solution, adjusted to weak alkalinity, of a water-soluble inorganic compound and/or a water-soluble organic compound.

Meanwhile, examples of commercial products of C. I. Pigment Yellow 150 used include "Hostaperm Yellow HN4G" manufactured by CLARIANT, "BAYSCRIPT (registered trademark) Yellow 4GF", "BAYPLAST (registered trademark) Yellow 5GN", "Yellow Pigment E4GN", and "Yellow Pigment E4GN-GT" manufactured by LANXESS, and "CROMOPHTAL (registered trademark) Yellow D 1085" manufactured by BASF Corporation.

Note that when a commercial product is used, the cleaning process described above may be applied to the commercial product from the viewpoint of reducing the amount of the compound represented by formula (2) in the ink. The preferred cleaning conditions are the same as those for the synthesized product described above.

In the embodiment of the present invention, the amount of the C. I. Pigment Yellow 150 in the ink is, relative to the total amount of the ink, preferably 1 to 10% by mass, more preferably 1.5 to 8% by mass, even more preferably 2 to 5% by mass, and particularly preferably 2.5 to 5% by mass, from the viewpoint of discharge stability, curability, viscosity stability, and color development. In the embodiment of the present invention, the ink contains a certain amount or less of the compound represented by the general formula 2, and also the influence of the compound represented by the general formula 2 can be suppressed. Thus, even when the amount of the C. I. Pigment Yellow 150 contained in the ink is high, it is possible to obtain an ink excellent in all of dispersion stability, viscosity stability, discharge stability, curability, and substrate adhesion.

<Active Energy Ray-Polymerizable Compound (A)>

An active energy ray-polymerizable compound (A) (hereinafter also simply referred to as "polymerizable compound") in the embodiment of the present invention has a function of causing a polymerization or cross-linking reaction by means of an initiating species such as a radical generated from a photopolymerization initiator or the like, which will be described later, and curing a composition containing these.

The ink of the embodiment of the present invention contains a compound (A-1) represented by general formula 1 as the active energy ray-polymerizable compound (A). As described above, it is thought that the compound (A-1) represented by general formula (1) captures a compound represented by general formula 2 and thus prevents deterioration, due to the compound, of the dispersion stability, viscosity stability, and discharge stability. This capture prevents the acylphosphine oxide initiator (B-1) from being cleaved by the compound represented by general formula 2 when the ink is stored and the like, and since the acylphosphine oxide initiator (B-1) added at the beginning of ink production can function sufficiently, it becomes possible to obtain a printed matter having excellent curability and substrate adhesion.

(Compound (A-1) Represented by General Formula 1)

Examples of the compound (A-1) represented by general formula 1 include diethylene glycol diacrylate, triethylene glycol diacrylate, a compound having acryloyl groups at both ends of four or more linked ethylene oxide groups (polyethylene glycol (number of EO groups≥4) diacrylate), 2-(2-vinyloxyethoxy)ethyl acrylate, and 2-[2-(2-vinyloxyethoxy)ethoxy]ethyl acrylate.

Among the above-listed compounds (A-1) represented by general formula 1, triethylene glycol diacrylate and/or 2-(vinyloxyethoxy)ethyl acrylate is preferably used because an ink having particularly excellent dispersion stability and viscosity stability can be obtained.

From the viewpoints of dispersion stability, viscosity stability, and discharge stability, the amount of the compound (A-1) represented by general formula 1 is, relative to the total amount of the ink, preferably 10 to 90% by mass, more preferably 30 to 90% by mass, and particularly preferably 50 to 85% by mass, from the viewpoint of obtaining an ink further having excellent adhesion.

(Compound (A-2))

From the viewpoint of further improving the curability and discharge stability, in the embodiment of the present invention, for the ink it is preferable to use a compound (A-1) represented by the above general formula 1 and a compound (A-2) selected from the group consisting of polypropylene glycol di(meth)acrylate and alkanediol di(meth)acrylate (also simply referred to as "compound (A-2)" in this description). In addition, the compound (A-2) has highly hydrophobic functional groups such as propylene oxide and alkyl groups, and is considered to be highly compatible with the siloxane surfactant (C-1) having a weight-average molecular weight of 400 to 20,000. Thus, the siloxane surfactant (C-1) can be uniformly present in the ink, and it becomes possible for the siloxane surfactant (C-1) to preferably bring about a capturing function of the compound represented by general formula 2, an adjustment function of the surface tension, and a leveling ability, which is considered to make the effect of the embodiment of the present invention more excellent.

In particular, it is preferable to use, as the compound (A-2), a compound selected from the group consisting of polypropylene glycol diacrylate and alkanediol diacrylate because of their excellent curability.

Note that descriptions such as "(meth)acrylate" and "(meth)acryloyl" in this description mean "acrylate and/or methacrylate" and "acryloyl and/or methacryloyl", respectively.

Examples of the polypropylene glycol di(meth)acrylate include dipropylene glycol di(meth)acrylate, tripropylene glycol di(meth)acrylate, and a compound having (meth)acryloyl groups at both ends of four or more linked propylene oxide groups (polypropylene glycol (number of PO groups≥4) di(meth)acrylate). Among these, it is preferable to use dipropylene glycol di(meth)acrylate and/or tripropylene glycol di(meth)acrylate from the viewpoint of curability and discharge stability, and it is particularly preferable to use dipropylene glycol diacrylate and/or tripropylene glycol diacrylate from the viewpoint of curability.

The alkanediol di(meth)acrylate may not have a branch or may have a branch. Examples of alkanediol di(meth)acrylates not having a branch include 1,4-butanediol di(meth)acrylate, 1,6-hexanediol di(meth)acrylate, 1,9-nonanediol di(meth)acrylate, and 1,10 decanediol di(meth)acrylate, and examples of alkanediol diacrylate having a branch include neopentyl glycol di(meth)acrylate, 2,4-dimethyl-1,5-pentanediol di(meth)acrylate, 3-methyl-1,5-pentanediol di(meth)acrylate, 2-ethyl-2-butyl butanediol di(meth)acrylate, and 2-ethyl-2-butyl propanediol di(meth)acrylate. Among these, it is preferable to use one or more selected from the group consisting of 1,6-hexanediol di(meth)acrylate, 1,9-nonanediol di(meth)acrylate, neopentyl glycol di(meth)acrylate, and 3-methyl-1,5-pentanediol di(meth)acrylate from the viewpoint of curability and discharge stability, and it is particularly preferable to use one or more selected from the group consisting of 1,6-hexanediol diacrylate, 1,9-nonanediol diacrylate, neopentyl glycol diacrylate, and 3-methyl-1,5-pentanediol diacrylate from the viewpoint of curability.

In the embodiment of the present invention, when the ink contains the compound (A-2), the amount thereof is, relative to the total amount of the ink, preferably 5 to 70% by mass, more preferably 10 to 50% by mass, and particularly preferably 15 to 50% by mass from the viewpoints of curability and discharge stability.

In addition, from the viewpoints of suitably increasing the compatibility with the siloxane surfactant (C-1) having the weight-average molecular weight of 400 to 20,000 and more suitably exhibiting the effect of the embodiment of the present invention, when the ink according to the embodiment of the present invention contains the compound (A-2), the ratio of the amount (% by mass) of the compound (A-2) with respect to the amount (% by mass) of the siloxane surfactant (C-1) in the ink is preferably 2 to 150, and particularly preferably 4 to 50.

(Other Polymerizable Compound)

The ink according to the embodiment of the present invention may contain a polymerizable compound other than the compounds described above (also referred to as "(an) other polymerizable compound" in this description). As another polymerizable compound, conventionally known monomers, oligomers, and polymers can be used. Note that "oligomers" and "polymers" are polymers in which multiple monomers bond together, and both are classified by degree of polymerization. That is, in this description, those with a degree of polymerization of 2 to 5 are called "oligomers" and those with a degree of polymerization of 6 or more are called "polymers".

Examples of the polymerizable group possessed by a radically polymerizable monomer include a (meth)acryloyl group, an N-vinyl group, a vinyl ether group, an allyl group, and an unsaturated carboxylic acid group. The radically polymerizable monomer may be a monofunctional monomer or a multifunctional monomer. In addition, when another polymerizable compound is used from the viewpoint of adjusting the reaction rate, physical properties of printed matters, physical properties of the ink, and the like, only one kind of compound may be used or a mixture of multiple polymerizable compounds may be used.

Note that in this description, "monofunctional" refers to a compound having only one polymerizable group in a molecule, and "bifunctional" and "trifunctional" refer to compounds having two or three polymerizable groups in a molecule, respectively. Note that in this description, bifunctional or more is also collectively referred to as "multifunctional".

In the embodiment of the present invention, when the ink contains a multifunctional monomer as another polymerizable compound, it is preferable to use a bifunctional monomer as the multifunctional monomer from the viewpoint of improving the substrate adhesion and discharge stability.

In the embodiment of the present invention, when the ink contains a monofunctional monomer as another polymerizable compound, it is preferable to use a monofunctional monomer whose homopolymer has a glass transition temperature of 50° C. or higher in an amount of 50% by mass or more relative to the total amount of monofunctional monomer contained in the ink, from the viewpoint of improving the curability and substrate adhesion.

Meanwhile, monofunctional monomers are generally known to be less curable than multifunctional monomers. Since many monofunctional monomers have a small molecular weight, the presence of a large amount of a monofunctional monomer in the ink may interfere with the above-described effect of capturing of the compound represented by general formula 2 by the compound (A-1) represented by general formula 1. In view of the above, when the ink contains a monofunctional monomer, the total amount thereof is, relative to the total amount of the compound (A-1) represented by general formula 1, preferably 85% by mass or less, and more preferably 70% by mass or less. When the total amount of a monofunctional monomer is 85% by mass or less relative to the total amount of the compound (A-1) represented by general formula 1, it becomes possible to simultaneously improve all of the dispersion stability, viscosity stability, and discharge stability of the ink, and the curability of printed matters.

Note that for the glass transition temperature of a homopolymer of a monofunctional monomer, a value is used when it is available from the catalog information of the monofunctional monomer, and when the catalog information is not available, a value is used that is obtained by conducting differential scanning calorimetry (DSC) using, as a sample, a homopolymer of a monofunctional monomer produced to have a weight-average molecular weight of 10,000 or more. Note that the weight-average molecular weight of the homopolymer can be determined using the same method as for the weight-average molecular weight of the siloxane surfactant (C-1) described below.

Examples of a monofunctional monomer that can be used as another polymerizable compound include: as a monofunctional (meth)acrylate compound (a compound having only one (meth)acryloyl group in a molecule as a polymerizable group), dicyclopentenyl(oxyethyl)(meth)acrylate, 2-methoxyethyl(meth)acrylate, methoxytriethylene glycol (meth)acrylate, 2-ethoxyethyl(meth)acrylate, 2-(2-ethoxyethoxy)ethyl(meth)acrylate, methoxydipropylene glycol (meth)acrylate, dipropylene glycol(meth)acrylate, 2-ethylhexyl EO-modified (meth)acrylate, β-carboxylethyl (meth)acrylate, trimethylolpropane formal(meth)acrylate, isoamyl(meth)acrylate, cyclohexyl(meth)acrylate, trimethylcyclohexyl(meth)acrylate, t-butylcyclohexyl(meth)acrylate, tetrahydrofurfuryl(meth)acrylate, isobornyl(meth)acrylate, norbomyl(meth)acrylate, dicyclopentanyl(meth)acrylate, isononyl(meth)acrylate, stearyl(meth)acrylate, n-octyl(meth)acrylate, isooctyl(meth)acrylate, lauryl(meth)acrylate, isodecyl(meth)acrylate, tridecyl(meth)acrylate, caprolactone(meth)acrylate, benzyl(meth)acrylate, phenoxyethyl(meth)acrylate, phenoxypolyethylene glycol (meth)acrylate, phenolic EO-modified (meth)acrylate, nonylphenol EO-modified (meth)acrylate, nonylphenol PO-modified (meth)acrylate, 2-hydroxy-3-phenoxypropyl (meth)acrylate, phthalic acid monohydroxyethyl(meth)acrylate 1,4-cyclohexanedimethanol(meth)acrylate, 2-hydroxyethyl(meth)acrylate, 2-hydroxypropyl(meth)acrylate, 4-hydroxybutyl(meth)acrylate, acryloyl morpholine, N-acryloyloxyethyl hexahydrophthalimide, hydroxyethylacrylamide, and dimethylaminopropylacrylamide; and as a monofunctional N-vinyl compound (a compound having only one N-vinyl group in a molecule as a polymerizable group), N-vinylcaprolactam, N-vinylpyrrolidone, N-vinyloxazolidinone, and N-vinylmethyloxazolidinone.

Among bifunctional monomers that can be used as another polymerizable compound, examples of a compound having two (meth)acryloyl groups in a molecule (bifunctional (meth)acrylate compound) include EO-modified 1,6-hexanediol di(meth)acrylate, PO-modified 1,6-hexanediol di(meth)acrylate, EO-modified neopentyl glycol di(meth)acrylate, PO-modified neopentyl glycol di(meth)acrylate, ethoxylated cyclohexane methanol di(meth)acrylate, ethylene glycol di(meth)acrylate, hydroxypivalic acid neopentyl glycol di(meth)acrylate, bisphenol A di(meth)acrylate, EO-modified bisphenol A di(meth)acrylate, PO-modified bisphenol A di(meth)acrylate, EO/PO-modified bisphenol A di(meth)acrylate, bisphenol F di(meth)acrylate, EO-modified bisphenol F di(meth)acrylate, PO-modified bisphenol F di(meth)acrylate, isocyanuric acid EO-modified diacrylate, tricyclodecane di(meth)acrylate, dimethyloltricyclodecane di(meth)acrylate, cyclohexanedimethanol di(meth)acrylate, trimethylolpropane di(meth)acrylate, neopentyl glycol-modified trimethylolpropane di(meth)acrylate, and dicyclopentanyl di(meth)acrylate.

Examples of a bifunctional monomer having one (meth)acryloyl group and one allyl group in a molecule that can be used as another polymerizable compound include 2-(allyloxymethyl)methyl acrylate and 2-(allyloxymethyl)ethyl acrylate.

Among trifunctional monomers that can be used as another polymerizable compound, examples of a trifunctional (meth)acrylate compound (a compound having three (meth)acryloyl groups in a molecule as a polymerizable group) include trimethylolpropane tri(meth)acrylate, trimethylolethan tri(meth)acrylate, EO-modified trimethylolpropane tri(meth)acrylate, PO-modified trimethylolpropane tri(meth)acrylate, tetramethylolmethan tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl)isocyanurate, hydroxypivalaldehyde-modified dimethylolpropane tri(meth)acrylate, sorbitol tri(meth)acrylate, propoxylated trimethylolpropane tri(meth)acrylate, EO-modified glycerol tri(meth)acrylate, and PO-modified glyceryl tri(meth)acrylate.

Among tetrafunctional monomers that can be used as another polymerizable compound, examples of a tetrafunctional (meth)acrylate compound (a compound having four (meth)acryloyl groups in a molecule as a polymerizable group) include pentaerythritol tetra(meth)acrylate, sorbitol tetra(meth)acrylate, ditrimethylolpropane tetra(meth)acrylate, propionic acid dipentaerythritol tetra(meth)acrylate, EO-modified pentaerythritol tetra(meth)acrylate, and tetramethylolmethane tetra(meth)acrylate.

Among pentafunctional monomers that can be used as another polymerizable compound, examples of a pentafunctional (meth)acrylate compound (a compound having five (meth)acryloyl groups in a molecule as a polymerizable group) include sorbitol penta(meth)acrylate and dipentaerythritol penta(meth)acrylate.

Among hexafunctional monomers that can be used as another polymerizable compound, examples of a hexafunctional (meth)acrylate compound (a compound having six (meth)acryloyl groups in a molecule as a polymerizable group) include dipentaerythritol hexa(meth)acrylate, sorbitol hexa(meth)acrylate, alkylene oxide-modified hexa(meth)acrylate of phosphazene, and F-caprolactone-modified dipentaerythritol hexa(meth)acrylate.

Note that the above "EO" refers to "ethylene oxide" and "PO" refers to "propylene oxide".

The amount of another polymerizable compound described above is, relative to the total mass of the ink, preferably 0 to 50% by mass and more preferably 0 to 30% by mass.

Note that "0% by mass" means that the material is not contained in the ink.

<Photopolymerization initiator (B)>

The ink according to the embodiment of the present invention contains the acylphosphine oxide initiator (B-1) as the photopolymerization initiator (B). Examples of the acylphosphine oxide initiator (B-1) include 2,4,6-trimethylbenzoyl-diphenylphosphine oxide, bis(2,4,6-trimethylbenzoyl)-phenylphosphine oxide, ethoxyphenyl(2,4,6-trimethylbenzoyl)phosphine oxide, and ethyl(3-benzoyl-2,4,6-trimethylbenzoyl)-phenylphosphinate, and compounds and the like disclosed in JP T 2016-535131 A can also be used. When commercial products are used, "OMNIRAD TPO", "OMNIRAD 819", "OMNIRAD 380", "OMNIRAD TPO-L", "OMNIPOL TP" manufactured by IGM Resins B.V., "Speedcure BPO", "Speedcure TPO", "Speedcure TPO-L", and "Speedcure XKm" manufactured by Lambson Ltd., and the like can be used suitably. These acylphosphine oxide initiators (B-1) may be used alone or in combination of two or more. In one preferred embodiment, two or more acylphosphine oxide initiators (B-1) can be used from the viewpoint of improving the curability and substrate adhesion.

Among them, in the preferred embodiment of the present invention, a compound having an alkoxyphosphine oxide structure can be used as the acylphosphine oxide initiator (B-1). The use of such a compound improves, in particular, the dispersion stability of the ink, and the curability and substrate adhesion of printed matters. The reason for this, although speculative, is thought to be that the alkoxy group prevents the approach of the compound represented by general formula 2, while the alkoxy group has a high affinity with the compound (A-1) that is represented by general formula 1 and has an ethylene oxide group. Note that from this viewpoint, the carbon number of the above alkoxy group is preferably 2 or more, and particularly preferably 2 or 3.

Among the compounds listed above, examples of a compound having an alkoxyphosphine oxide structure include ethoxyphenyl(2,4,6-trimethylbenzoyl)phosphine oxide, and ethyl(3-benzoyl-2,4,6-trimethylbenzoyl)-phenylphosphinate. Among the compounds exemplified as commercial products, "OMNIRAD TPO-L" and "OMNIPOL TP" manufactured by IGM Resins B.V., and "Speedcure TPO-L" and "Speedcure XKm" manufactured by Lambson Ltd., are compounds having an alkoxyphosphine oxide structure.

Note that in the embodiment of the present invention, it is also possible to use a compound having an alkoxyphosphine oxide structure and a compound not having an alkoxyphosphine oxide structure in combination as the acylphosphine oxide initiator (B-1). In this case, from the viewpoints that the above-described effects can be favorably expressed and the dispersion stability of the ink and the curability and substrate adhesion of printed matters can be simultaneously improved, the amount of a compound having an alkoxyphosphine oxide structure is, relative to the total amount of the acylphosphine oxide initiator (B-1), preferably 30% or more and less than 100% by mass, and particularly preferably 50% or more and less than 100% by mass.

Furthermore, in the embodiment of the present invention, it is preferable to use an u-hydroxyketone initiator in addition to the acylphosphine oxide initiator (B-1) as the photopolymerization initiator (B) from the viewpoints of dispersion stability, viscosity stability, curability, and discharge stability. The reason for this is not entirely clear but is presumed to be that the interaction of the hydroxyl group in the u-hydroxyketone initiator with the compound represented by general formula (2) causes the u-hydroxyketone initiator to exhibit the same function as the compound (A-1) represented by general formula (1) or the siloxane surfactant (C-1) having a weight-average molecular weight of 400 to 20,000, and suppresses the interaction between the compound represented by general formula (2) and the phosphine oxide moiety in the acylphosphine oxide initiator (B-1).

Examples of the u-hydroxyketone initiator include 1-hydroxycyclohexyl phenyl ketone ("OMNIRAD 184" manufactured by IGM Resins B.V.), 2-hydroxy-2-methyl-1-phenyl-propane–1-on ("OMNIRAD 1173" manufactured by IGM Resins B.V.), 1-[4-(2-hydroxyethoxy)-phenyl]-2-hydroxy-2-methyl-1-propane–1-on ("OMNIRAD 659" manufactured by IGM Resins B.V.), 2-hydroxy-1-{4-[4-(2-hydroxy-2-methyl-propionyl)-benzyl]-phenyl}-2-methyl-propane-1-on ("OMNIRAD 127" manufactured by IGM Resins B.V.), oligo{2-hydroxy-2-methyl-1-[4-(1-methylvinyl)phenyl]}propanone ("ESACURE ONE" and "ESACURE KIP150" manufactured by IGM Resins B.V.), and 2-hydroxy-1-{4-[4-(2-hydroxy-2-methylpopanoyl)phenoxy]phenyl}-2-methylpropane-1-on ("ESACURE KIP160" manufactured by IGM Resins B.V.).

(Other Photopolymerization Initiator)

In the embodiment of the present invention, the ink may further contain a conventionally known photopolymerization initiator in addition to a compound described above. For example, it is preferable to use a photopolymerization initiator of a molecular cleavage type and/or a hydrogen abstraction type. A photopolymerization initiator for generating a radical and a photopolymerization initiator for generating a cation may be used in combination.

Meanwhile, in the embodiment of the present invention, as the photopolymerization initiator, the blending amount of an α-aminoalkylphenone initiator is preferably limited.

While the detailed mechanism is unclear, this is because when a large amount of an α-aminoalkylphenone initiator is added, it interacts with not only the compound represented by general formula 2 but also the melamine contained in C.

I. Pigment Yellow 150, resulting in deterioration of the dispersion stability, viscosity stability, and viscosity stability.

Specifically, in the embodiment of the present invention, the amount of an α-aminoalkylphenone initiator contained in the ink is preferably 3% by mass or less (may be 0% by mass), more preferably 2% by mass or less (may be 0% by mass), even more preferably 1% by mass or less (may be 0% by mass), and particularly preferably 0.5% by mass or less (may be 0% by mass).

Note that examples of the α-aminoalkylphenone initiator include 2-methyl-1-[4-(methylthio)phenyl]-2-morpholino-propane-1-on (OMNIRAD 907 manufactured by IGM Resins B.V.), 2-benzyl-2-dimethylamino-1-(4-morpholinophenyl)-butanone-1 (OMNIRAD 369 manufactured by IGM Resins B.V.), and 2-dimethylamino-2-(4-methylbenzyl)-1-(4-morpholinophenyl)-1-butanone (OMNIRAD 379 manufactured by IGM Resins B.V.).

<Surfactant (C)>

(Siloxane Surfactant (C-1))

In the embodiment of the present invention, the ink contains the siloxane surfactant (C-1) having a weight-average molecular weight of 400 to 20,000 as the surfactant (C). As described above, by capturing the compound represented by general formula 2, which is generated in trace amounts when the ink is stored or the like, the siloxane surfactant (C-1) can cause the ink to have excellent dispersion stability and viscosity stability over a long period of time, as well as curability, substrate adhesion, and discharge stability. In addition, based on the surface tension adjustment function and leveling ability imparting function of the siloxane surfactant (C-1), it becomes also possible to ensure discharge stability and further improve substrate adhesion.

The weight-average molecular weight of the siloxane surfactant (C-1) is more preferably 550 to 18,000, and even more preferably 1,000 to 14,000. While the details are unclear, it is preferable to use a polyether-modified siloxane surfactant as the siloxane surfactant (C-1) in view of its high effect of capturing the compound represented by general formula 2.

For the siloxane surfactant (C-1), a synthesized product using a conventionally known method, or a commercial product may be used. Examples of the commercial product include BYK (registered trademark)-348, 349, 378, and BYK-UV3500, UV3510 manufactured by BYK Japan KK, and TEGO (registered trademark) Glide 450, 440, 435, 432, 410, 406, and TEGO (registered trademark) Rad 2100, 2200N, 2250, 2300, 2500, 2650, 2700 manufactured by Evonik Degussa GmbH.

Note that the weight-average molecular weight of the siloxane surfactant (C-1) is a polystyrene-converted value, which can be measured using a conventional method. An example of the measurement method is a method using a GPC (e.g., HLC-8320GPC manufactured by Tosoh Corporation) equipped with a TSKgel column (manufactured by Tosoh Corporation) and an RI detector, and using THF as a developing solvent.

From the viewpoint of achieving all of dispersion stability, discharge stability, and a leveling ability, the amount of the siloxane surfactant (C-1) is, in the total amount of the ink, preferably 0.1 to 3% by mass, and more preferably 0.2 to 2.5% by mass.

(Other Surfactant)

In the embodiment of the present invention, the ink may contain a surfactant other than the siloxane surfactant (C-1) described above (also referred to as "(an)other surfactant" in this description). Examples of another surfactant used include siloxane surfactants (having a weight-average molecular weight of less than 400 or greater than 20,000), fluorinated surfactants, acrylic surfactants, and acetylene glycol surfactants. Among these, a siloxane surfactant (having a weight-average molecular weight of less than 400 or greater than 20,000) and/or an acrylic surface modifier can be preferably used from the viewpoint of obtaining an ink having excellent substrate adhesion, discharge stability, and the like without inhibiting the siloxane surfactant (C-1).

<Other Components>

In the embodiment of the present invention, the ink can contain a pigment dispersing resin, a polymerization inhibitor, an organic solvent, and the like, other than the components described above as necessary.

(Pigment Dispersing Resin)

Among other components, as the pigment dispersing resin, a commercial product or a product synthesized using a conventionally known method can be used. Specific examples of the commercial product include "Disperbyk (registered trademark)-106" and "Disperbyk-145" manufactured by BYK Japan KK, and "Solsperse (registered trademark) J-180", "Solsperse 32000", and "Solsperse 39000" manufactured by The Lubrizol Corporation.

(Polymerization Inhibitor)

A polymerization inhibitor can also be used to enhance the dispersion stability, viscosity stability, and discharge stability over a long period of time. As the polymerization inhibitor, hindered phenol-based compounds, phenothiazine-based compounds, hindered amine-based compounds, and phosphorus-based compounds are suitably used, and specific examples thereof include 4-methoxyphenol, hydroquinone, methyl hydroquinone, t-butyl hydroquinone, 2,6-di-t-butyl-4-methylphenol, phenothiazine, and aluminum salt of N-nitrosophenyl hydroxylamine. From the viewpoint of enhancing the dispersion stability, viscosity stability, and discharge stability while maintaining the curability, the amount of the polymerization inhibitor is, relative to the entirety of the ink, preferably 0.01 to 2% by mass and more preferably 0.1 to 1% by mass.

<Ink Production Method>

In the embodiment of the present invention, the ink can be produced using a conventionally known method. To give a specific example, first, C. I. Pigment Yellow 150 and a polymerizable compound are mixed as necessary with a pigment dispersing resin, a polymerization inhibitor, and the like, and then are dispersed using a paint shaker, a sand mill, a roll mill, a media-less disperser, or the like to obtain a pigment dispersion (pigment dispersion preparation process).

Subsequently, a siloxane surfactant (C-1), the remainder of the polymerizable compound, an acylphosphine oxide initiator (B-1), and, as necessary, another photopolymerization initiator and other components are added to the obtained pigment dispersion to obtain the desired ink properties, and are mixed well (ink preparation process). Then, an ink according to the embodiment of the present invention is obtained by filtering coarse particles using a filter or the like (ink filtration process).

Note that the compound (A-1) represented by general formula 1 may be added during the above-described process of preparing the pigment dispersion or subsequent process of preparing the ink. However, it is preferable to add it during the process of adding the siloxane surfactant (C-1) from the viewpoint that the above-described effects of the embodiment of the present invention are preferably brought about and the dispersion stability, viscosity stability, and discharge stability of the ink can be further improved.

<Printed Matter and Method of Producing Printed Matter>

A printed matter according to an embodiment of the present invention can be obtained by printing the above-described active energy ray-curable inkjet ink on a substrate. An example of a method for producing the printed matter includes a process (printing process) in which the active energy ray-curable inkjet ink is jetted from a nozzle of an inkjet head and is applied on a substrate, and a process (curing process) in which the active energy ray-curable inkjet ink applied on the substrate is irradiated with active energy rays to cure the active energy ray-curable inkjet ink.

(Printing Process)

As a method for printing the ink on a substrate, droplets of the ink are jetted from an inkjet head and are adhered to the substrate. Note that droplets of the same ink may be adhered to an area on the substrate one or more times. An example of a printing process in which droplets are adhered one time is a process in which a substrate is conveyed while an inkjet head is fixed, and when the substrate passes under the inkjet head, the ink is jetted from the inkjet head (line head type one-pass printing process). An example of a printing process in which droplets are adhered multiple times is a process in which an inkjet head is scanned in a direction perpendicular to the direction in which a substrate is conveyed, and the ink is jetted to the same area on the substrate multiple times (shuttle head type multi-pass printing process).

(Curing Process)

There is no particular limitation on the source of active energy rays, and a conventionally known source can be used. Specific examples include ultraviolet lamps such as high-pressure mercury lamps, ultra-high-pressure mercury lamps, metal halide lamps, excimer laser lamps, and xenon lamps; ultraviolet light-emitting diodes (UV-LEDs); and ultraviolet laser diodes (UV-LDs). These sources of active energy rays may be used alone or in combination.

<Substrate>

Examples of the substrate used in the above-described methods for producing a printed matter include plastic substrates such as polypropylene (PP), polyethylene (PE), polyethylene terephthalate (PET), nylon, polystyrene, and acrylic (PMMA, and the like); paper substrates such as art coated papers, semi-gloss coated papers, and cast coated papers; and metal substrates such as aluminum evaporated paper.

The substrate may have a surface that is smooth or of uneven shape, and may be transparent, semi-transparent or opaque. In addition, the substrate may be made from two or more of the above various kinds of substrates bonded together. Furthermore, the substrate may have a functional layer such as a releasable adhesive layer on the opposite side of the printing surface.

EXAMPLES OF EMBODIMENTS

The followings are preferred examples of embodiments of the present invention. The embodiments of the present invention are not limited to the following examples.

(1) An active energy ray-curable inkjet ink containing C. I. Pigment Yellow 150, an active energy ray-polymerizable compound (A), a photopolymerization initiator (B), and a surfactant (C), wherein the active energy ray-polymerizable compound (A) contains a compound (A-1) represented by general formula 1, the photopolymerization initiator (B) contains an acylphosphine oxide initiator (B-1), the surfactant (C) contains a siloxane surfactant (C-1) having a weight-average molecular weight of 400 to 20,000, and a total amount of a compound represented by general formula 2 below contained in the active energy ray-curable inkjet ink is 100 ppm or less.

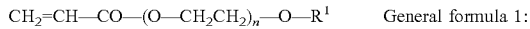
General formula 1:

(In general formula 1, $R^1$ represents an acryloyl group or a vinyl group, and n represents an integer of 2 to 10.)

General formula 2:

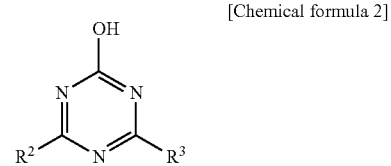
[Chemical formula 2]

(In general formula 2, $R^2$ and $R^3$ each independently represent an amino group or hydroxyl group.)

(2) The active energy ray-curable inkjet ink according to the above (1), wherein the active energy ray-polymerizable compound (A) further contains a compound (A-2) selected from the group consisting of polypropylene glycol di(meth)acrylate and alkanediol di(meth)acrylate.

(3) The active energy ray-curable inkjet ink according to the above (1) or (2), wherein an amount of the compound (A-1) represented by general formula 1 is 10 to 90% by mass of a total amount of the active energy ray-curable inkjet ink.

(4) A printed matter obtained using the active energy ray-curable inkjet ink according to any of the above (1) to (3).

EXAMPLES

While the present invention will be described in further detail below, the following examples do not limit the scope of the rights of the present invention in any way. Unless otherwise noted, "parts" represents parts by mass and "%" represents % by mass.

Note that in the following, a gas chromatograph 6890N+ 5973 manufactured by Agilent Technologies Japan, Ltd. was used for the determination of the amount of the compound represented by general formula (2) present in the ink. A calibration curve was made using a standard ammelin reagent, standard ammelide reagent, and standard cyanuric acid reagent. Pyridine was used to extract the components in the ink, and a HP-5 19091 J-413 manufactured by Agilent Technologies Japan, Ltd. was used for the column. Furthermore, the injection volume for the measurement was 1.0 μL, and the column temperature was 280° C. Note that in the following, three measurements were made using the method described above, and the average value was determined as "total amount of the compound represented by general formula (2) in the ink".

Also, in the following, the weight-average molecular weight was determined using a GPC (HLC-8320) manufactured by Tosoh Corporation equipped with three TSKgel SuperHM-M columns (manufactured by Tosoh Corporation). Note that measurements were made using THF (tetrahydrofuran) as a developing solvent at a flow rate of 0.6 mL/min, an injection volume of 10 μL, and a column temperature of 40° C. Note that the calibration curve was made using a standard polystyrene sample.

<Preparation of Pigments a to E>

By using the method described in example 2 of JP 2014-012838A, C. I. Pigment Yellow 150 (hereinafter, referred to as "pigment E") was prepared. Then, 100 parts of the above pigment E was put into a container containing 1 L of a sodium hydroxide aqueous solution adjusted to pH 8.0 and was stirred at 25° C. for 1 hour. After stirring, the pigment filtered through a suction filtration was further washed using purified water, dried at 80° C. and ground in a laboratory mill (tabletop grinder), thereby obtaining a washed product of C. I. Pigment Yellow 150 (hereinafter referred to as "pigment D").

In addition, the above washing operation was repeated multiple times, and a two-times washed product of C. I. Pigment Yellow 150 (hereinafter referred to as "pigment C"), a three-times washed product of C. I. Pigment Yellow 150 (hereafter referred to as "pigment B"), and a four-times washed product of C. I. Pigment Yellow 150 (hereafter referred to as "pigment A") were each prepared.

<Synthesis of Siloxane Surfactants 1 to 8>

A reaction container equipped with a gas inlet tube, a thermometer, a condenser, and a stirrer was charged with 100 parts of polyethylene glycol allyl methyl ether (average molecular weight 750) and 0.5 parts of a 0.5% by mass toluene solution of platinic chloride, and replacement with nitrogen gas was performed. After the inside of the reaction container was heated to 70° C., 200 parts of a methylhydrogensiloxane-dimethylsiloxane copolymer (average silicon number: 88, hydrogen atom mass: about 0.04% by mass) was added dropwise over a period of 30 minutes. The inside of the reaction container was heated to 110° C. and held thereat for 3 hours while stirring, and thus the siloxane surfactant 1 was obtained. Note that the weight-average molecular weight of the siloxane surfactant 1 was 13,000.

In addition, the siloxane surfactants 2 to 8 were obtained in the same manner as the siloxane surfactant 1, except that the type and amount added of the polyethylene glycol allyl methyl ether (allyl ether compound) and the type of the methylhydrogensiloxane-dimethylsiloxane copolymer (siloxane polymer) were changed as shown in Table 1 below.

<Production of Pigment Dispersions a to G>

The obtained pigments A to E were then used to produce pigment dispersions. A pigment dispersion A was produced by sequentially putting 15 parts of the pigment A, 7.5 parts of Solsperse J180 (manufactured by The Lubrizol Corporation) as a pigment dispersing resin, and 77.5 parts of triethylene glycol diacrylate into a tank, stirring using a high-speed mixer until uniform, and dispersing the mixture using a horizontal sand mill for about 1 hour.

A pigment dispersion B was produced in the same manner as the pigment dispersion A, except that 2-(2-vinyloxyethoxy) ethyl acrylate was used instead of triethylene glycol diacrylate. Similarly, a pigment dispersion C was produced in the same manner as the pigment dispersion A, except that dipropylene glycol diacrylate was used instead of triethylene glycol diacrylate.

Pigment dispersions D to G were produced using the same production method as the pigment dispersion A, except that the pigment B, pigment C, pigment D, and pigment E were used instead of the pigment A, respectively.

<Production of Active Energy Ray-Curable Inkjet Ink>

According to the blending amount described in the column of example 1 in Table 2, the pigment dispersion A, polymerizable compound (A), photopolymerization initiator (B), siloxane surfactant, and other components (the details will be described below) were sequentially fed into a mixing container while stirring, and were mixed while maintaining the temperature at 40 to 50° C. until the solid component in the photopolymerization initiator (B) was dissolved. Then, filtering using a depth-type filter having a pore size of 1 μm was performed to remove coarse particles, and thus an active energy ray-curable inkjet ink 1 was obtained.

In addition, active energy ray-curable inkjet inks 2 to 45 having the blending composition shown in Table 2 were obtained through the same operation as for the above active energy ray-curable inkjet ink 1. The amount of the compound represented by general formula 2 present in the ink was determined for the obtained active energy ray-curable inkjet inks 1 to 45 using the method described above.

TABLE 1

| Siloxane surfactant No. | Allyl ether compound | Amount added (parts) | Siloxane polymer | Weight-average molecular weight |
|---|---|---|---|---|
| 1 | Polyethylene glycol allyl methyl ether (average molecular weight 750) | 100 | Methylhydrogensiloxane-dimethylsiloxane copolymer (average silicon number 88, hydrogen atom mass about 0.04%) | 13000 |
| 2 | Polyethylene glycol allyl methyl ether (average molecular weight 750) | 100 | Dimethylhydrogen-terminated polydimethylsiloxane (average silicon number 60, hydrogen atom mass about 0.045%) | 8500 |
| 3 | Polyethylene glycol allyl ether (average molecular weight 400) | 250 | Dimethylhydrogen-terminated polydimethylsiloxane (average silicon number 35, hydrogen atom mass about 0.08%) | 3500 |
| 4 | Polyethylene glycol allyl methyl ether (average molecular weight 500) | 200 | Methylhydrogensiloxane-dimethylsiloxane copolymer (average silicon number 88, hydrogen atom mass about 0.18%) | 18000 |
| 5 | Triethylene glycol allyl methyl ether | 450 | Octamethyltetrasiloxane | 1000 |
| 6 | Diethylene glycol allyl ether | 400 | Heptamethyltrisiloxane | 480 |
| 7 | Ethylene glycol allyl ether | 300 | Heptamethyltrisiloxane | 380 |
| 8 | Polyethylene glycol allyl methyl ether (average molecular weight 750) | 400 | Methylhydrogensiloxane-dimethylsiloxane copolymer (average silicon number 60, hydrogen atom mass about 0.28%) | 25000 |

TABLE 2

| | | | | Examples | | | | | |
|---|---|---|---|---|---|---|---|---|---|
| | | | | 1 | 1 a | 1 b | 2 | 3 | 3 a |
| | Active energy ray-curable inkjet ink No. | | | 1 | 1 a | 1 b | 2 | 3 | 3 a |
| Blending amounts | Pigment dispersion | Type | | A | A | A | A | A | A |
| | | Blending amount | | 20 | 20 | 20 | 20 | 20 | 20 |
| | Polymerizable compounds(A) | Compound (A-1) represented by general formula 1 | TEGDA | 65 | 65 | 64 | 26 | 25 | 22 |
| | | | PEG200DA | | | | | | |
| | | | PEG400DA | | | | | | |
| | | | PEG600DA | | | | | | |
| | | | VEEA | | | | | | |
| | | Compound (A-2) | Polypropylene glycol di(meth)acrylate | DPGDA | | | | | | |
| | | | | TPGDA | | | | | | |
| | | Alkanediol di(meth)acrylate | HDDA | | | | | | |
| | | | NDDA | | | | | | |
| | | Other polymerizable compound | Monofunctional monomer | PEA | | | | 10 | | |
| | | | | THFA | | | | 10 | | |
| | | | | VMOX | | | | | | |
| | | | | IBXA | | | | | 20 | 26 |
| | | | Bifunctional monomer | NPG(PO)$_2$DA | | | | | 20 | 17 |
| | | | | BPA(EO)$_2$DA | | | | 10 | | |
| | | | Trifunctional monomer | TMPTA | | | | 10 | | |
| | Photopolymerization initiator(B) | Acylphosphine oxide initiator(B-1) | TPO | 9 | 8 | 7 | | 9 | 9 |
| | | | TPO-L | | | | | | |
| | | | BAPO | 4 | 4 | 3 | 3 | | |
| | | | BAPO-L | | | | | | |
| | | α-hydroxyketone initiator | OMN184 | | | | | | |
| | | | ESACUREONE | | | | | | |
| | | | KIP150 | | | | | | |
| | | | KIP160 | | | | | | |
| | | Other photopolymerization initiator | OMN369 | | 1 | 4 | 3 | 2 | 2 |
| | | | ITX | | | | 3 | | |
| | | | BMS | | | | 3 | 2 | 2 |
| | Surfactant(C) | Siloxane surfactant(C-1) | Siloxane surfactant 1 | | | | | | |
| | | | Siloxane surfactant 2 | | | | | | |
| | | | Siloxane surfactant 3 | 1.2 | 1.2 | 1.2 | 1.2 | 1.2 | 1.2 |
| | | | Siloxane surfactant 4 | | | | | | |
| | | | Siloxane surfactant 5 | | | | | | |
| | | | Siloxane surfactant 6 | | | | | | |
| | | | Siloxane surfactant 7 | | | | | | |
| | | | Siloxane surfactant 8 | | | | | | |
| | | Acrylic surfactant | BYK-350 | | | | | | |
| | | Other component | | 0.8 | 0.8 | 0.8 | 0.8 | 0.8 | 0.8 |
| | Total | | | 100 | 100 | 100 | 100 | 100 | 100 |
| | Total amount of compound represented by general formula (2) in ink (ppm) | | | 28 | 32 | 31 | 32 | 29 | 30 |
| | Total amount of compound (A-1) in ink (%) | | | 80.5 | 80.5 | 79.5 | 41.5 | 40.5 | 37.5 |
| | Total amount of compound (A-2) in ink (%) | | | 0 | 0 | 0 | 0 | 0 | 0 |
| | Total amount of monofunctional monomer/total amount of compound (A-1) | | | 0.0% | 0.0% | 0.0% | 48.2% | 49.4% | 69.3% |
| Evaluation items | Dispersion stability | | | 5 | 4 | 4 | 5 | 5 | 5 |
| | Viscosity stability | | | 4 | 4 | 3 | 4 | 4 | 4 |
| | Curability | | | 4 | 4 | 4 | 3 | 4 | 4 |
| | Substrate adhesion | | | 5 | 5 | 5 | 4 | 4 | 4 |
| | Discharge stability | | | 4 | 4 | 3 | 4 | 4 | 4 |

| | | | | Examples | | | | | |
|---|---|---|---|---|---|---|---|---|---|
| | | | | 3 b | 4 | 5 | 5 a | 6 | 7 | 8 |
| | Active energy ray-curable inkjet ink No. | | | 3 b | 4 | 5 | 5 a | 6 | 7 | 8 |
| Blending amounts | Pigment dispersion | Type | | A | A | A | A | D | E | B |
| | | Blending amount | | 20 | 20 | 20 | 20 | 20 | 20 | 20 |
| | Polymerizable compounds(A) | Compound (A-1) represented by general formula 1 | TEGDA | 20 | | | | 65 | 65 | |
| | | | PEG200DA | | | | | | | |
| | | | PEG400DA | | | | | | | |
| | | | PEG600DA | | | | | | | |
| | | | VEEA | | 35 | 35 | 35 | | | 66 |
| | | Compound (A-2) | Polypropylene glycol di(meth)acrylate | DPGDA | | | | | | | |
| | | | | TPGDA | | | | | | | |
| | | Alkanediol di(meth)acrylate | HDDA | | | | | | | |
| | | | NDDA | | | | | | | |

TABLE 2-continued

|  |  |  |  |  |  |  |  |  |  |  |
|---|---|---|---|---|---|---|---|---|---|---|
|  | Other polymerizable compound | Monofunctional monomer | PEA |  |  |  |  |  |  |  |
|  |  |  | THFA |  |  |  |  |  |  |  |
|  |  |  | VMOX |  | 30 | 30 | 30 |  |  |  |
|  |  |  | IBXA | 30 |  |  |  |  |  |  |
|  |  | Bifunctional monomer | NPG(PO)$_2$DA | 15 |  |  |  |  |  |  |
|  |  |  | BPA(EO)$_2$DA |  |  |  |  |  |  |  |
|  |  | Trifunctional monomer | TMPTA |  |  |  |  |  |  |  |
| Photopoly-merization initiator(B) | Acylphosphine oxide initiator(B-1) | | TPO | 9 | 9 |  |  | 9 | 9 | 12 |
|  |  |  | TPO-L |  |  | 6 | 3 |  |  |  |
|  |  |  | BAPO |  |  | 3 | 6 | 4 | 4 |  |
|  |  |  | BAPO-L |  |  |  |  |  |  |  |
|  | α-hydroxyketone initiator | | OMN184 |  |  |  |  |  |  |  |
|  |  |  | ESACUREONE |  |  |  |  |  |  |  |
|  |  |  | KIP150 |  |  |  |  |  |  |  |
|  |  |  | KIP160 |  |  |  |  |  |  |  |
|  | Other photopoly-merization initiator | | OMN369 | 2 | 2 | 2 | 2 |  |  |  |
|  |  |  | ITX |  |  |  |  |  |  |  |
|  |  |  | BMS | 2 | 2 | 2 | 2 |  |  |  |
| Surfactant(C) | Siloxane surfactant(C-1) | | Siloxane surfactant 1 |  |  |  |  |  |  |  |
|  |  |  | Siloxane surfactant 2 |  |  |  |  |  |  |  |
|  |  |  | Siloxane surfactant 3 | 1.2 | 1.2 | 1.2 | 1.2 | 1.2 | 1.2 | 1.2 |
|  |  |  | Siloxane surfactant 4 |  |  |  |  |  |  |  |
|  |  |  | Siloxane surfactant 5 |  |  |  |  |  |  |  |
|  |  |  | Siloxane surfactant 6 |  |  |  |  |  |  |  |
|  |  |  | Siloxane surfactant 7 |  |  |  |  |  |  |  |
|  |  |  | Siloxane surfactant 8 |  |  |  |  |  |  |  |
|  | Acrylic surfactant | | BYK-350 |  |  |  |  |  |  |  |
|  | Other component | | | 0.8 | 0.8 | 0.8 | 0.8 | 0.8 | 0.8 | 0.8 |
|  | Total | | | 100 | 100 | 100 | 100 | 100 | 100 | 100 |
|  | Total amount of compound represented by general formula (2) in ink (ppm) | | | 30 | 32 | 28 | 30 | 57 | 87 | 29 |
|  | Total amount of compound (A-1) in ink (%) | | | 35.5 | 50.5 | 50.5 | 50.5 | 80.5 | 80.5 | 81.5 |
|  | Total amount of compound (A-2) in ink (%) | | | 0 | 0 | 0 | 0 | 0 | 0 | 0 |
|  | Total amount of monofunctional monomer/ total amount of compound (A-1) | | | 84.5% | 59.4% | 59.4% | 59.4% | 0.0% | 0.0% | 0.0% |
| Evaluation items | Dispersion stability | | | 4 | 5 | 5 | 4 | 4 | 3 | 5 |
|  | Viscosity stability | | | 3 | 4 | 4 | 4 | 4 | 4 | 4 |
|  | Curability | | | 3 | 4 | 5 | 5 | 4 | 4 | 4 |
|  | Substrate adhesion | | | 4 | 4 | 5 | 4 | 5 | 5 | 5 |
|  | Discharge stability | | | 3 | 4 | 4 | 4 | 4 | 4 | 4 |

|  |  |  |  | Examples | | | | | |
|---|---|---|---|---|---|---|---|---|---|
|  |  |  |  | 9 | 10 | 11 | 12 | 13 | 14 |
|  | Active energy ray-curable inkjet ink No. | | | 9 | 10 | 11 | 12 | 13 | 14 |
| Blending amounts | Pigment dispersion | | Type | B | C | C | C | A | A |
|  |  |  | Blending amount | 20 | 20 | 20 | 20 | 20 | 20 |
|  | Poly merizable compounds(A) | Compound (A-1) represented by general formula 1 | TEGDA |  |  |  |  |  |  |
|  |  |  | PEG200DA |  |  |  |  |  | 46 |
|  |  |  | PEG400DA |  |  |  |  |  |  |
|  |  |  | PEG600DA |  |  |  |  |  |  |
|  |  |  | VEEA | 75 | 12 | 11 | 9 |  | 20 |
|  | Compound (A-2) | Polypropylene glycol di(meth)acrylate | DPGDA |  | 54 |  | 37 | 66 |  |
|  |  |  | TPGDA |  |  |  |  |  |  |
|  |  | Alkanediol di(meth)acrylate | HDDA |  |  |  | 20 |  |  |
|  |  |  | NDDA |  |  |  |  |  |  |
|  | Other polymerizable compound | Monofunctional monomer | PEA |  |  |  | 20 |  |  |
|  |  |  | THFA |  |  |  |  |  |  |
|  |  |  | VMOX |  |  |  |  |  |  |
|  |  |  | IBXA |  |  | 35 |  |  |  |
|  |  | Bifunctional monomer | NPG(PO)$_2$DA |  |  |  |  |  |  |
|  |  |  | BPA(EO)$_2$DA |  |  |  |  |  |  |
|  |  | Trifunctional monomer | TMPTA |  |  |  |  |  |  |
| Photopoly-merization initiator(B) | Acylphosphine oxide initiator(B-1) | | TPO |  | 12 | 12 | 12 | 12 | 12 |
|  |  |  | TPO-L |  |  |  |  |  |  |
|  |  |  | BAPO | 3 |  |  |  |  |  |
|  |  |  | BAPO-L |  |  |  |  |  |  |
|  | α-hydroxyketone initiator | | OMN184 |  |  |  |  |  |  |
|  |  |  | ESACUREONE |  |  |  |  |  |  |
|  |  |  | KIP150 |  |  |  |  |  |  |
|  |  |  | KIP160 |  |  |  |  |  |  |
|  | Other photopoly-merization initiator | | OMN369 |  |  |  |  |  |  |
|  |  |  | ITX |  |  |  |  |  |  |
|  |  |  | BMS |  |  |  |  |  |  |
| Surfactant(C) | Siloxane surfactant(C-1) | | Siloxane surfactant 1 |  |  |  |  |  |  |
|  |  |  | Siloxane surfactant 2 |  |  |  |  |  |  |

TABLE 2-continued

|  |  |  |  |  |  |  |  |  |
|---|---|---|---|---|---|---|---|---|
|  |  | Siloxane surfactant 3 | 1.2 | 1.2 | 1.2 | 1.2 | 1.2 | 1.2 |
|  |  | Siloxane surfactant 4 |  |  |  |  |  |  |
|  |  | Siloxane surfactant 5 |  |  |  |  |  |  |
|  |  | Siloxane surfactant 6 |  |  |  |  |  |  |
|  |  | Siloxane surfactant 7 |  |  |  |  |  |  |
|  |  | Siloxane surfactant 8 |  |  |  |  |  |  |
|  | Acrylic surfactant | BYK-350 |  |  |  |  |  |  |
|  | Other component |  | 0.8 | 0.8 | 0.8 | 0.8 | 0.8 | 0.8 |
|  | Total |  | 100 | 100 | 100 | 100 | 100 | 100 |
|  | Total amount of compound represented by general formula (2) in ink (ppm) |  | 30 | 29 | 28 | 31 | 31 | 30 |
|  | Total amount of compound (A-1) in ink (%) |  | 90.5 | 12 | 11 | 9 | 15.5 | 81.5 |
|  | Total amount of compound (A-2) in ink (%) |  | 0 | 69.5 | 15.5 | 72.5 | 66 | 0 |
|  | Total amount of monofunctional monomer/ total amount of compound (A-1) |  | 0.0% | 0.0% | 500.0% | 0.0% | 0.0% | 0.0% |
| Evaluation items | Dispersion stability |  | 4 | 4 | 4 | 3 | 3 | 5 |
|  | Viscosity stability |  | 3 | 3 | 3 | 3 | 3 | 4 |
|  | Curability |  | 4 | 5 | 3 | 5 | 5 | 4 |
|  | Substrate adhesion |  | 4 | 3 | 3 | 3 | 3 | 5 |
|  | Discharge stability |  | 3 | 5 | 3 | 4 | 4 | 4 |

|  |  |  |  | Examples |  |  |  |  |  |  |
|---|---|---|---|---|---|---|---|---|---|---|
|  |  |  |  | 15 | 16 | 17 | 18 | 19 | 20 | 21 |
|  | Active energy ray-curable inkjet ink No. |  |  | 15 | 16 | 17 | 18 | 19 | 20 | 21 |
| Blending amounts | Pigment dispersion | Type |  | A | A | A | A | A | A | A |
|  |  | Blending amount |  | 20 | 20 | 20 | 20 | 20 | 20 | 20 |
| Poly merizable compounds(A) | Compound (A-1) represented by general formula 1 | TEGDA |  |  |  |  | 66 | 66 | 66 |  |
|  |  | PEG200DA |  |  |  |  |  |  |  |  |
|  |  | PEG400DA |  | 46 |  |  |  |  |  |  |
|  |  | PEG600DA |  |  | 46 |  |  |  |  |  |
|  |  | VEEA |  | 20 | 20 |  |  |  | 66 | 66 |
|  | Compound (A-2) | Polypropylene glycol di(meth)acrylate | DPGDA |  |  |  |  |  |  |  |
|  |  |  | TPGDA |  |  |  |  |  |  |  |
|  |  | Alkanediol di(meth)acrylate | HDDA |  |  |  |  |  |  |  |
|  |  |  | NDDA |  |  |  |  |  |  |  |
|  | Other polymerizable compound | Monofunctional monomer | PEA |  |  |  |  |  |  |  |
|  |  |  | THFA |  |  |  |  |  |  |  |
|  |  |  | VMOX |  |  |  |  |  |  |  |
|  |  |  | IBXA |  |  |  |  |  |  |  |
|  |  | Bifunctional monomer | NPG(PO)$_2$DA |  |  |  |  |  |  |  |
|  |  |  | BPA(EO)$_2$DA |  |  |  |  |  |  |  |
|  |  | Trifunctional monomer | TMPTA |  |  |  |  |  |  |  |
| Photopoly-merization initiator(B) | Acylphosphine oxide initiator(B-1) | TPO |  | 12 | 12 |  | 7 | 7 |  | 7 |
|  |  | TPO-L |  |  |  | 12 |  |  | 12 |  |
|  |  | BAPO |  |  |  |  |  | 5 |  | 5 |
|  |  | BAPO-L |  |  |  |  | 5 |  |  |  |
|  | α-hydroxyketone initiator | OMN184 |  |  |  |  |  |  |  |  |
|  |  | ESACUREONE |  |  |  |  |  |  |  |  |
|  |  | KIP150 |  |  |  |  |  |  |  |  |
|  |  | KIP160 |  |  |  |  |  |  |  |  |
|  | Other photopoly-merization initiator | OMN369 |  |  |  |  |  |  |  |  |
|  |  | ITX |  |  |  |  |  |  |  |  |
|  |  | BMS |  |  |  |  |  |  |  |  |
| Surfactant(C) | Siloxane surfactant(C-1) | Siloxane surfactant 1 |  |  |  |  |  |  |  |  |
|  |  | Siloxane surfactant 2 |  |  |  |  |  |  |  |  |
|  |  | Siloxane surfactant 3 |  | 1.2 | 1.2 | 1.2 | 1.2 | 1.2 | 1.2 | 1.2 |
|  |  | Siloxane surfactant 4 |  |  |  |  |  |  |  |  |
|  |  | Siloxane surfactant 5 |  |  |  |  |  |  |  |  |
|  |  | Siloxane surfactant 6 |  |  |  |  |  |  |  |  |
|  |  | Siloxane surfactant 7 |  |  |  |  |  |  |  |  |
|  |  | Siloxane surfactant 8 |  |  |  |  |  |  |  |  |
|  | Acrylic surfactant | BYK-350 |  |  |  |  |  |  |  |  |
|  | Other component |  |  | 0.8 | 0.8 | 0.8 | 0.8 | 0.8 | 0.8 | 0.8 |
|  | Total |  |  | 100 | 100 | 100 | 100 | 100 | 100 | 100 |
|  | Total amount of compound represented by general formula (2) in ink (ppm) |  |  | 31 | 32 | 31 | 30 | 29 | 31 | 27 |
|  | Total amount of compound (A-1) in ink (%) |  |  | 81.5 | 81.5 | 81.5 | 81.5 | 81.5 | 81.5 | 81.5 |
|  | Total amount of compound (A-2) in ink (%) |  |  | 0 | 0 | 0 | 0 | 0 | 0 | 0 |
|  | Total amount of monofunctional monomer/ total amount of compound (A-1) |  |  | 0.0% | 0.0% | 0.0% | 0.0% | 0.0% | 0.0% | 0.0% |
| Evaluation items | Dispersion stability |  |  | 5 | 5 | 5 | 5 | 5 | 5 | 5 |
|  | Viscosity stability |  |  | 4 | 4 | 4 | 4 | 4 | 4 | 4 |
|  | Curability |  |  | 4 | 4 | 4 | 4 | 4 | 4 | 4 |
|  | Substrate adhesion |  |  | 5 | 5 | 5 | 5 | 5 | 5 | 5 |
|  | Discharge stability |  |  | 4 | 4 | 4 | 4 | 4 | 4 | 4 |

TABLE 2-continued

|  |  |  |  | Examples | | | | | |
|---|---|---|---|---|---|---|---|---|---|
|  |  |  |  | 22 | 23 | 24 | 25 | 26 | 27 |
|  | Active energy ray-curable inkjet ink No. | | | 22 | 23 | 24 | 25 | 26 | 27 |
| Blending amounts | Pigment dispersion | Type | | A | A | A | A | A | A |
|  |  | Blending amount | | 20 | 20 | 20 | 20 | 20 | 20 |
|  | Polymerizable compounds(A) | Compound (A-1) represented by general formula 1 | TEGDA |  | 65 | 65 | 65 | 65 | 65 |
|  |  |  | PEG200DA |  |  |  |  |  |  |
|  |  |  | PEG400DA |  |  |  |  |  |  |
|  |  |  | PEG600DA |  |  |  |  |  |  |
|  |  |  | VEEA | 66 |  |  |  |  |  |
|  |  | Compound (A-2) | | | | | | | |
|  |  | Polypropylene glycol di(meth)acrylate | DPGDA |  |  |  |  |  |  |
|  |  |  | TPGDA |  |  |  |  |  |  |
|  |  | Alkanediol di(meth)acrylate | HDDA |  |  |  |  |  |  |
|  |  |  | NDDA |  |  |  |  |  |  |
|  |  | Other polymerizable compound | | | | | | | |
|  |  | Monofunctional monomer | PEA |  |  |  |  |  |  |
|  |  |  | THFA |  |  |  |  |  |  |
|  |  |  | VMOX |  |  |  |  |  |  |
|  |  |  | IBXA |  |  |  |  |  |  |
|  |  | Bifunctional monomer | $NPG(PO)_2DA$ |  |  |  |  |  |  |
|  |  |  | $BPA(EO)_2DA$ |  |  |  |  |  |  |
|  |  | Trifunctional monomer | TMPTA |  |  |  |  |  |  |
|  | Photopolymerization initiator(B) | Acylphosphine oxide initiator(B-1) | TPO | 7 | 12 | 12 | 12 | 12 | 12 |
|  |  |  | TPO-L |  |  |  |  |  |  |
|  |  |  | BAPO |  |  |  |  |  |  |
|  |  |  | BAPO-L | 5 |  |  |  |  |  |
|  |  | α-hydroxyketone initiator | OMN184 |  |  |  |  |  |  |
|  |  |  | ESACUREONE |  |  |  |  |  |  |
|  |  |  | KIP150 |  |  |  |  |  |  |
|  |  |  | KIP160 |  |  |  |  |  |  |
|  |  | Other photopolymerization initiator | OMN369 |  |  |  |  |  |  |
|  |  |  | ITX |  |  |  |  |  |  |
|  |  |  | BMS |  |  |  |  |  |  |
|  | Surfactant(C) | Siloxane surfactant(C-1) | Siloxane surfactant 1 |  | 2 |  |  |  |  |
|  |  |  | Siloxane surfactant 2 |  |  |  | 2 |  |  |
|  |  |  | Siloxane surfactant 3 | 1.2 |  |  |  |  |  |
|  |  |  | Siloxane surfactant 4 |  |  | 2 |  |  |  |
|  |  |  | Siloxane surfactant 5 |  |  |  |  | 2 |  |
|  |  |  | Siloxane surfactant 6 |  |  |  |  |  | 2 |
|  |  |  | Siloxane surfactant 7 |  |  |  |  |  |  |
|  |  |  | Siloxane surfactant 8 |  |  |  |  |  |  |
|  |  | Acrylic surfactant | BYK-350 |  |  |  |  |  |  |
|  | Other component | | | 0.8 | 1.0 | 1.0 | 1.0 | 1.0 | 1.0 |
|  | Total | | | 100 | 100 | 100 | 100 | 100 | 100 |
|  | Total amount of compound represented by general formula (2) in ink (ppm) | | | 28 | 29 | 28 | 30 | 32 | 28 |
|  | Total amount of compound (A-1) in ink (%) | | | 81.5 | 80.5 | 80.5 | 80.5 | 80.5 | 80.5 |
|  | Total amount of compound (A-2) in ink (%) | | | 0 | 0 | 0 | 0 | 0 | 0 |
|  | Total amount of monofunctional monomer/total amount of compound (A-1) | | | 0.0% | 0.0% | 0.0% | 0.0% | 0.0% | 0.0% |
| Evaluation items | Dispersion stability | | | 5 | 5 | 5 | 5 | 5 | 5 |
|  | Viscosity stability | | | 4 | 4 | 4 | 4 | 4 | 3 |
|  | Curability | | | 4 | 4 | 4 | 4 | 4 | 4 |
|  | Substrate adhesion | | | 5 | 5 | 5 | 5 | 5 | 5 |
|  | Discharge stability | | | 4 | 4 | 4 | 3 | 4 | 3 |

|  |  |  |  | Examples | | | | | |
|---|---|---|---|---|---|---|---|---|---|
|  |  |  |  | 28 | 29 | 30 | 31 | 32 | 33 | 34 |
|  | Active energy ray-curable inkjet ink No. | | | 28 | 29 | 30 | 31 | 32 | 33 | 34 |
| Blending amounts | Pigment dispersion | Type | | A | A | A | A | A | A | A |
|  |  | Blending amount | | 20 | 20 | 20 | 20 | 20 | 20 | 20 |
|  | Polymerizable compounds(A) | Compound (A-1) represented by general formula 1 | TEGDA |  |  |  |  |  |  |  |
|  |  |  | PEG200DA |  |  |  |  |  | 10 | 10 |
|  |  |  | PEG400DA |  |  |  |  |  |  |  |
|  |  |  | PEG600DA |  |  |  |  |  |  |  |
|  |  |  | VEEA | 55 | 55 | 30 | 30 | 30 | 40 | 40 |

TABLE 2-continued

|  |  |  |  |  |  |  |  |  |  |
|---|---|---|---|---|---|---|---|---|---|
|  | Compound (A-2) | Polypropylene glycol di(meth)acrylate | DPGDA | 10 | 10 | 10 | 10 | 10 |  | 5 |
|  |  |  | TPGDA |  |  |  |  |  | 15 |  |
|  |  | Alkanediol di(meth)acrylate | HDDA |  |  | 25 | 25 | 25 |  |  |
|  |  |  | NDDA |  |  |  |  |  |  | 10 |
|  | Other polymerizable compound | Monofunctional monomer | PEA |  |  |  |  |  |  |  |
|  |  |  | THFA |  |  |  |  |  |  |  |
|  |  |  | VMOX |  |  |  |  |  |  |  |
|  |  |  | IBXA |  |  |  |  |  |  |  |
|  |  | Bifunctional monomer | NPG(PO)$_2$DA |  |  |  |  |  |  |  |
|  |  |  | BPA(EO)$_2$DA |  |  |  |  |  |  |  |
|  |  | Trifunctional monomer | TMPTA |  |  |  |  |  |  |  |
| Photopolymerization initiator(B) | Acylphosphine oxide initiator(B-1) |  | TPO | 12 | 12 | 12 | 12 | 12 | 7 | 7 |
|  |  |  | TPO-L |  |  |  |  |  |  |  |
|  |  |  | BAPO |  |  |  |  |  | 3 | 3 |
|  |  |  | BAPO-L |  |  |  |  |  |  |  |
|  | α-hydroxyketone initiator |  | OMN184 |  |  |  |  |  | 3 | 3 |
|  |  |  | ESACUREONE |  |  |  |  |  |  |  |
|  |  |  | KIP150 |  |  |  |  |  |  |  |
|  |  |  | KIP160 |  |  |  |  |  |  |  |
|  | Other photopolymerization initiator |  | OMN369 |  |  |  |  |  |  |  |
|  |  |  | ITX |  |  |  |  |  |  |  |
|  |  |  | BMS |  |  |  |  |  |  |  |
| Surfactant(C) | Siloxane surfactant(C-1) |  | Siloxane surfactant 1 |  |  |  |  |  |  |  |
|  |  |  | Siloxane surfactant 2 | 2.2 |  |  |  |  |  |  |
|  |  |  | Siloxane surfactant 3 |  | 2.2 |  |  |  | 1.2 | 1.2 |
|  |  |  | Siloxane surfactant 4 |  |  | 2.2 |  |  |  |  |
|  |  |  | Siloxane surfactant 5 |  |  |  | 2.2 |  |  |  |
|  |  |  | Siloxane surfactant 6 |  |  |  |  | 2.2 |  |  |
|  |  |  | Siloxane surfactant 7 |  |  |  |  |  |  |  |
|  |  |  | Siloxane surfactant 8 |  |  |  |  |  |  |  |
|  | Acrylic surfactant |  | BYK-350 |  |  |  |  |  |  |  |
|  | Other component |  |  | 0.8 | 0.8 | 0.8 | 0.8 | 0.8 | 0.8 | 0.8 |
|  | Total |  |  | 100 | 100 | 100 | 100 | 100 | 100 | 100 |
|  | Total amount of compound represented by general formula (2) in ink (ppm) |  |  | 32 | 30 | 31 | 29 | 29 | 27 | 30 |
|  | Total amount of compound (A-1) in ink (%) |  |  | 70.5 | 70.5 | 45.5 | 45.5 | 45.5 | 65.5 | 65.5 |
|  | Total amount of compound (A-2) in ink (%) |  |  | 10 | 10 | 35 | 35 | 35 | 15 | 15 |
|  | Total amount of monofunctional monomer/total amount of compound (A-1) |  |  | 0.0% | 0.0% | 0.0% | 0.0% | 0.0% | 0.0% | 0.0% |
| Evaluation items | Dispersion stability |  |  | 5 | 5 | 5 | 5 | 5 | 5 | 5 |
|  | Viscosity stability |  |  | 4 | 4 | 3 | 4 | 3 | 5 | 5 |
|  | Curability |  |  | 5 | 5 | 5 | 5 | 5 | 5 | 5 |
|  | Substrate adhesion |  |  | 5 | 5 | 5 | 5 | 5 | 5 | 5 |
|  | Discharge stability |  |  | 5 | 5 | 3 | 5 | 3 | 5 | 5 |

|  |  |  |  | Examples |  |  |  | Comparative examples |  |
|---|---|---|---|---|---|---|---|---|---|
|  |  |  |  | 35 | 36 | 37 | 38 | 1 | 2 |
|  | Active energy ray-curable inkjet ink No. |  |  | 35 | 36 | 37 | 38 | 39 | 40 |
| Blending amounts | Pigment dispersion | Type |  | B | B | C | C | F | G |
|  |  | Blending amount |  | 20 | 20 | 20 | 20 | 20 | 20 |
| Polymerizable compounds(A) | Compound (A-1) represented by general formula 1 | TEGDA |  |  |  |  |  | 65 | 65 |
|  |  | PEG200DA |  |  |  |  |  |  |  |
|  |  | PEG400DA |  |  |  | 10 |  |  |  |
|  |  | PEG600DA |  |  |  |  |  |  |  |
|  |  | VEEA |  | 40 | 40 | 42.5 | 40 |  |  |
|  | Compound (A-2) | Polypropylene glycol di(meth)acrylate | DPGDA | 14.5 | 14 |  | 15 |  |  |
|  |  |  | TPGDA |  |  | 15 |  |  |  |
|  |  | Alkanediol di(meth)acrylate | HDDA | 15 | 15 |  | 15 |  |  |
|  |  |  | NDDA |  |  |  |  |  |  |
|  | Other polymerizable compound | Monofunctional monomer | PEA |  |  |  |  |  |  |
|  |  |  | THEA |  |  |  |  |  |  |
|  |  |  | VMOX |  |  |  |  |  |  |
|  |  |  | IBXA |  |  |  |  |  |  |
|  |  | Bifunctional monomer | NPG(PO)$_2$DA |  |  |  |  |  |  |
|  |  |  | BPA(EO)$_2$DA |  |  |  |  |  |  |
|  |  | Trifunctional monomer | TMPTA |  |  |  |  |  |  |
| Photopolymerization initiator(B) | Acylphosphine oxide initiator(B-1) |  | TPO |  |  |  |  | 9 | 9 |
|  |  |  | TPO-L | 3 | 3 | 3 | 3 |  |  |
|  |  |  | BAPO | 3 | 3 | 3 | 3 | 4 | 4 |
|  |  |  | BAPO-L |  |  |  |  |  |  |

TABLE 2-continued

| | | | | | | | | |
|---|---|---|---|---|---|---|---|---|
| | α-hydroxyketone initiator | OMN184 | | | | | | |
| | | ESACUREONE | 3 | 3 | | | | |
| | | KIP150 | | | 3 | | | |
| | | KIP160 | | | | 3 | | |
| | Other photopolymerization initiator | OMN369 | | | | | | |
| | | ITX | | | | | | |
| | | BMS | | | | | | |
| Surfactant(C) | Siloxane surfactant(C-1) | Siloxane surfactant 1 | | 0.5 | | | | |
| | | Siloxane surfactant 2 | | | | | | |
| | | Siloxane surfactant 3 | 0.7 | 0.7 | 2.5 | 0.2 | 1.2 | 1.2 |
| | | Siloxane surfactant 4 | | | | | | |
| | | Siloxane surfactant 5 | | | | | | |
| | | Siloxane surfactant 6 | | | | | | |
| | | Siloxane surfactant 7 | | | | | | |
| | | Siloxane surfactant 8 | | | | | | |
| | Acrylic surfactant | BYK-350 | | | | | | |
| | Other component | | 0.8 | 0.8 | 1.0 | 0.8 | 0.8 | 0.8 |
| | Total | | 100 | 100 | 100 | 100 | 100 | 100 |
| | Total amount of compound represented by general formula (2) in ink (ppm) | | 32 | 31 | 30 | 30 | 161 | 239 |
| | Total amount of compound (A-1) in ink (%) | | 55.5 | 55.5 | 52.5 | 40 | 80.5 | 80.5 |
| | Total amount of compound (A-2) in ink (%) | | 29.5 | 29 | 30.5 | 45.5 | 0 | 0 |
| | Total amount of monofunctional monomer/ total amount of compound (A-1) | | 0.0% | 0.0% | 0.0% | 0.0% | 0.0% | 0.0% |
| Evaluation items | Dispersion stability | | 5 | 5 | 5 | 5 | 2 | 1 |
| | Viscosity stability | | 5 | 5 | 5 | 5 | 3 | 2 |
| | Curability | | 5 | 5 | 5 | 5 | 3 | 2 |
| | Substrate adhesion | | 5 | 5 | 5 | 5 | 4 | 3 |
| | Discharge stability | | 5 | 5 | 5 | 5 | 2 | 1 |

| | | | | | Comparative examples | | | | |
|---|---|---|---|---|---|---|---|---|---|
| | | | | | 3 | 4 | 5 | 6 | 7 |
| | Active energy ray-curable inkjet ink No. | | | | 41 | 42 | 43 | 44 | 45 |
| Blending amounts | Pigment dispersion | Type | | | C | A | A | A | A |
| | | Blending amount | | | 20 | 20 | 20 | 20 | 20 |
| | Polymerizable compounds(A) | Compound (A-1) represented by general formula 1 | TEGDA | | | | 65 | 65 | 65 |
| | | | PEG200DA | | | | | | |
| | | | PEG400DA | | | | | | |
| | | | PEG600DA | | | | | | |
| | | | VEEA | | | | | | |
| | | Compound (A-2) | Polypropylene glycol di(meth)acrylate | DPGDA | | | | | |
| | | | | TPGDA | | | | | |
| | | | Alkanediol di(meth)acrylate | HDDA | 65 | 64 | | | |
| | | | | NDDA | | | | | |
| | | Other polymerizable compound | Monofunctional monomer | PEA | | | | | |
| | | | | THEA | | | | | |
| | | | | VMOX | | | | | |
| | | | | IBXA | | | | | |
| | | | Bifunctional monomer | NPG(PO)$_2$DA | | | | | |
| | | | | BPA(EO)$_2$DA | | | | | |
| | | | Trifunctional monomer | TMPTA | | | | | |
| | Photopolymerization initiator(B) | Acylphosphine oxide initiator(B-1) | TPO | | 9 | | 9 | 9 | 9 |
| | | | TPO-L | | | | | | |
| | | | BAPO | | 4 | | 4 | 4 | 4 |
| | | | BAPO-L | | | | | | |
| | | α-hydroxyketone initiator | OMN184 | | | | | | |
| | | | ESACUREONE | | | 5 | | | |
| | | | KIP150 | | | | | | |
| | | | KIP160 | | | | | | |
| | | Other photopolymerization initiator | OMN369 | | | 3 | | | |
| | | | ITX | | | 3 | | | |
| | | | BMS | | | 3 | | | |
| | Surfactant(C) | Siloxane surfactant(C-1) | Siloxane surfactant 1 | | | | | | |
| | | | Siloxane surfactant 2 | | | | | | |
| | | | Siloxane surfactant 3 | | 1.2 | 1.2 | | | |
| | | | Siloxane surfactant 4 | | | | | | |
| | | | Siloxane surfactant 5 | | | | | | |
| | | | Siloxane surfactant 6 | | | | | | |
| | | | Siloxane surfactant 7 | | | | | 1.3 | |
| | | | Siloxane surfactant 8 | | | | | | 1.3 |
| | | Acrylic surfactant | BYK-350 | | | | | | 1.3 |
| | | Other component | | | 0.8 | 0.8 | 0.7 | 0.7 | 0.7 |
| | | Total | | | 100 | 100 | 100 | 100 | 100 |

TABLE 2-continued

| | | | | | | |
|---|---|---|---|---|---|---|
| | Total amount of compound represented by general formula (2) in ink (ppm) | 32 | 29 | 28 | 30 | 31 |
| | Total amount of compound (A-1) in ink (%) | 0 | 15.5 | 80.5 | 80.5 | 80.5 |
| | Total amount of compound (A-2) in ink (%) | 80.5 | 64 | 0 | 0 | 0 |
| | Total amount of monofunctional monomer/ total amount of compound (A-1) | — | 0.0% | 0.0% | 0.0% | 0.0% |
| Evaluation items | Dispersion stability | 1 | 4 | 1 | 2 | 1 |
| | Viscosity stability | 2 | 4 | 3 | 2 | 1 |
| | Curability | 4 | 1 | 4 | 4 | 4 |
| | Substrate adhesion | 4 | 1 | 3 | 2 | 2 |
| | Discharge stability | 2 | 4 | 2 | 1 | 1 |

Note that the details of abbreviations for the materials listed in Table 2 are as follows.

(Polymerizable Compounds (A))

TEGDA: Triethylene glycol diacrylate (in general formula 1, $R^1$=acryloyl group, n=3)
PEG200DA: Polyethylene glycol 200 diacrylate (in general formula 1, $R^1$=acryloyl group, n≈4)
PEG400DA: Polyethylene glycol 400 diacrylate (in general formula 1, $R^1$=acryloyl group, n≈9)
PEG600DA: Polyethylene glycol 600 diacrylate (in general formula 1, $R^1$=acryloyl group, n≈14)
VEEA: 2-(2-vinyloxyethoxy)ethyl acrylate (in general formula 1, $R^1$=vinyl group, n =2)
DPGDA: dipropylene glycol diacrylate
TPGDA: tripropylene glycol diacrylate
HDDA: 1,6-hexanediol diacrylate
NDDA: 1,9-nonanediol diacrylate
PEA: phenoxyethyl acrylate
THFA: tetrahydrofurfuryl acrylate
VMOX: N-vinyl methyl oxazolidinone
IBXA: isobornyl acrylate
NPG(PO)$_2$DA: PO-modified neopentyl glycol diacrylate (PO radix=2)
BPA(EO)$_2$DA: EO-modified bisphenol A diacrylate (EO radix=2)
TMPTA: trimethylolpropane triacrylate (Photopolymerization initiators (B))

TPO: OMNIRAD TPO (2,4,6-trimethylbenzoyl-diphenylphosphine oxide, manufactured by IGM Resins B.V.)
TPO-L: OMNIRAD TPO-L (ethoxyphenyl (2,4,6-trimethylbenzoyl)phosphine oxide, manufactured by IGM Resins B.V.)
BAPO: OMNIRAD 380 (bis(2,4,6-trimethylbenzoyl)-phenylphosphine oxide, manufactured by IGM Resins B.V.)
BAPO-L: a liquid bisacylphosphine oxide initiator manufactured using the materials and method described in example 4 of JP-T 2016-535131 A
OMN184: OMNIRAD 184 (1-hydroxycyclohexylphenyl ketone, manufactured by IGM Resins B.V.)
ESACUREONE: oligo{2-hydroxy-2-methyl-1-[4-(1-methylvinyl)phenyl]}propanone (manufactured by IGM Resins B.V.)
KIP150: ESACUREKIP150 (oligo{2-hydroxy-2-methyl-1-[4-(1-methylvinyl)phenyl]}propanone, manufactured by IGM Resins B.V.)
KIP160: ESACUREKIP160 (2-hydroxy-1-{4-[4-(2-hydroxy-2-methylpopanoyl)phenoxy]phenyl}-2-methylpropane-1-on, manufactured by IGM Resins B.V.)
OMN369: OMNIRAD 369 (2-benzyl-2-(dimethylamino)-1-[4'-(morpholino)phenyl]-1-butanone, manufactured by IGM Resins B.V.)
ITX: Speedcure ITX (isopropylthioxanthone, manufactured by Lambson Ltd.,)
BMS: OMNIRAD BMS ([4-(methylphenylthio)phenyl]-phenylmethane, manufactured by IGM Resins B.V.)

(Surfactant (C))

BYK-350: acrylic surfactant manufactured by BYK Japan KK,

A mixture of the following materials was used as the "other components" listed in Table 2.

2,6-di-t-butyl-4-methylphenol: 0.5 parts

Diethylene glycol diethyl ether: the remainder (the amount until the total amount of components fed in the mixing container reaches 100 parts)

Examples 1 to 38 and Comparative Examples 1 to 7

The above-obtained active energy ray-curable inkjet inks were evaluated using the following methods. The evaluation results are shown in Table 2.

<Dispersion Stability Evaluation>

Each of the above active energy ray-curable inkjet inks was filled in a 20-mL glass container with a filling ratio of 90% of the container capacity, and then stored in a hermetically sealed and light-shielded state in an environment at 60° C. for 7 days. Then, the ink was pressure-filtered using a wire mesh having a mesh opening of 3 μm, and the residue on the wire mesh was washed with methyl ethyl ketone. The washed wire mesh was then observed under a microscope at a magnification of 500 times, and the number of precipitates remaining on the wire mesh was counted. The evaluation criteria are as follows, and the practical range was defined to be 3 or more.

5: there were no precipitates
4: there were 1 to 3 precipitates
3: there were 4 to 5 precipitates
2: there were 6 to 9 precipitates
1: there were 10 or more precipitates <Viscosity Stability Evaluation>

After measuring the viscosity of each of the above-produced active energy ray-curable inkjet inks, the ink was filled in a 20 mL-glass container with a filling ratio of 90% of the container capacity, and then stored in a hermetically sealed and light-shielded state in an environment at 60° C. for 7 days. After the storage, the viscosity was measured again to determine the rate of change. For the viscosity measurement, a Lovis 2000 ME manufactured by Anton Paar GmbH was used, and the temperature during the measurement was set to 25° C. The evaluation criteria were as follows, and the practical range was defined to be 3 or more.

5: viscosity change rate is less than 1%
4: viscosity change rate is 1% or more and less than 3%
3: viscosity change rate is 3% or more and less than 5%

2: viscosity change rate is 5% or more and less than 10%
1: viscosity change rate is 10% or more <Production of Solid Printed Matter>

By using an inkjet ejector ("OnePass JET" manufactured by Tritek Co., Ltd.) equipped with an inkjet head KJ4A-AA (resolution: 600 dpi×600 dpi) manufactured by KYOCERA Corporation and a metal halide lamp described below, above a conveyor capable of transporting a substrate, each of the active energy ray-curable inkjet inks produced above was printed on a PET substrate (PET25(A) PL SIN 8LK) manufactured by Lintec Corporation under the conditions of a droplet volume of 14 µL and a printing rate of 100%. Then, by using a 240 W/cm metal halide lamp manufactured by GEW Ltd., a printed matter was irradiated in such a manner that the integrated light amount was 200 mJ/cm$^2$, and the ink was cured to produce a solid printed matter. Note that the series of processes from printing to curing was performed under a printing speed of 50 m/min.

<Curability Evaluation>

The curability was evaluated by rubbing the surface of a solid printed matter obtained through the above method with a fingernail and by checking the tackiness of the surface of the printed matter. The evaluation criteria were as follows, and the practical range was defined to be 3 or more.

5: cured film did not come off even after hard rubbing with a fingernail, and the surface was not tacky
4: cured film came off partly after hard rubbing with a fingernail, but the surface was not tacky
3: cured film came off partly after rubbing with a fingernail, but the surface was not tacky
2: cured film came off partly after rubbing with a fingernail, and the surface was slightly tacky
1: cured film came off easily after being hit with a fingernail, and the surface was tacky <Evaluation of Substrate Adhesion>

After producing solid printed matters using the above method for the various substrates described below, six horizontal and six vertical cuts were made at 2.5 mm intervals. Then, cellophane tape was attached from the top of the cuts, rubbed from the top surface with an eraser, and was sufficiently adhered to the solid printed matter, and then the cellophane tape was peeled off while maintaining that the printed surface of the solid printed matter and the cellophane tape were at 90°. Then, adhesion was evaluated from the proportion of the area of the solid printed matter that was peeled with the cellophane tape relative to the area to which the cellophane tape had been adhered. The evaluation criteria were as follows, and the practical range was defined to be 3 or more.

5: area of the peeled solid printed matter is less than 5%
4: area of the peeled solid printed matter is 5% or more and less than 15%
3: area of the peeled solid printed matter is 15% or more and less than 25%
2: area of the peeled solid printed matter is 25% or more and less than 50%
1: area of the peeled solid printed matter is 50% or more Note that the substrates used for the above adhesion evaluation are as follows, and the evaluation results listed in Table 2 are for the substrates with the worst evaluation results.

PP: PP TOP WHITE manufactured by UPM Raflatac
PET: PET50 K2411 manufactured by Lintec Corporation
Coated paper: Raflacoat manufactured by UPM Raflatac <Discharge Stability Evaluation>

Each of the above-produced active energy ray-curable inkjet inks was filled in the inkjet ejector used for producing the above solid printed matters, and then a nozzle check pattern was printed on a coated paper (Raflacoat) manufactured by UPM Raflatac. After confirming that there were no nozzle misfires, 100,000 droplets were jetted from each nozzle and then the nozzle check pattern was printed again on the above coated paper, and the discharge stability was evaluated by counting the number of nozzle misfires. The evaluation criteria were as follows, and the practical range was defined to be 3 or more.

5: no nozzle misfires after printing 100,000 droplets
4: 1 to 2 nozzle misfires after printing 100,000 droplets
3: 3 to 5 nozzle misfires after printing 100,000 droplets
2: 6 to 10 nozzle misfires after printing 100,000 droplets
1: 10 or more nozzle misfires after printing 100,000 droplets As shown in Table 2, it was confirmed that the active energy ray-curable inkjet inks 1 to 38, which satisfy the embodiment of the present invention, were excellent in all of dispersion stability, viscosity stability, curability, substrate adhesion, and discharge stability.

Among them, it was confirmed that an ink having particularly excellent quality can be obtained by using the acylphosphine oxide initiator (B-1) and the α-hydroxyketone initiator together as the photopolymerization initiator (B), as in examples 33 to 38.

Comparing examples 8 with 29, for example, it became clear that curability and discharge stability can be further improved by using, in combination as the polymerizable compound (A), the compound (A-2) selected from the group consisting of (poly)propylene glycol diacrylate and alkanediol diacrylate.

Furthermore, a comparison between examples 10 and 13 indicates differences in dispersion stability and discharge stability, despite the fact that the types and amounts of materials in the inks were almost identical. It is thought that the further improvement in the above qualities was achieved in example 10 where the compound (A-1) represented by general formula 1 and the siloxane surfactant (C-1) were added and mixed at the same time.

In addition, a comparison between examples 1, 1a, and 1b indicates that good results can be obtained in dispersion stability, viscosity stability, and viscosity stability by keeping the amount of the α-aminoalkylphenone initiator low in the photopolymerization initiator.

Comparing examples 3, 3a, and 3b, it is thought that by reducing the proportion of the total amount of a monofunctional monomer relative to the total amount of the compound (A-1) represented by general formula (1), the dispersion stability, viscosity stability, and discharge stability of the ink, and the curability of the printed material can all be improved simultaneously.

A comparison between examples 4, 5, and 5a indicates that the curability is better when a compound having an alkoxyphosphine oxide structure and a compound not having an alkoxyphosphine oxide structure are used in combination as the acylphosphine oxide initiator (B-1). Furthermore, it is found that the dispersion stability of the ink and the curability and substrate adhesion of the printed matter simultaneously improve proportionate to an increase in the amount of a compound having an alkoxyphosphine oxide structure when used in combination.

In contrast, as can be seen from comparative examples 1 and 2, when the amount of the compound represented by general formula (2) exceeded 100 ppm in the active energy ray-curable inkjet ink, dispersion stability and discharge stability deteriorated and did not reach a practical level.

It was confirmed from comparative examples 3 and 5 to 7 that when the compound (A-1) represented by general formula 1 or the siloxane surfactant (C-1) having the weight-average molecular weight of 400 to 20,000 was not contained, one or more items of dispersion stability, viscosity stability, and discharge stability were below the practical level.

From the above, it was confirmed that the active energy ray-curable inkjet ink according to the embodiment of the present invention has excellent dispersion stability and is also excellent in curability, substrate adhesion, discharge stability, and transparency.

The disclosure of the present application relates to the subject matter disclosed in Japanese Application No. 2021-192636 filed on Nov. 29, 2021, the contents of which are incorporated by reference herein.

The invention claimed is:

1. An active energy ray-curable inkjet ink comprising: C. I. Pigment Yellow 150; an active energy ray-polymerizable compound (A); a photopolymerization initiator (B); and a surfactant (C), wherein
    the active energy ray-polymerizable compound (A) contains a compound (A-1) represented by general formula 1,
    the photopolymerization initiator (B) contains an acylphosphine oxide initiator (B-1),
    the surfactant (C) contains a siloxane surfactant (C-1) having a weight-average molecular weight of 400 to 20,000,
    the active energy ray-curable inkjet ink contains or does not contain a monofunctional monomer, and when the active energy ray-curable inkjet ink contains the monofunctional monomer, a total amount of 85% by mass or less relative to a total amount of the compound (A-1), and
    a total amount of a compound represented by general formula 2 below contained in the active energy ray-curable inkjet ink is 100 ppm or less, $$CH_2=CH-CO-(O-CH_2CH_2)_n-O-R^1 \quad \text{General formula 1}$$

wherein, $R^1$ represents an acryloyl group or a vinyl group, and n represents an integer of 2 to 10, General formula 2:

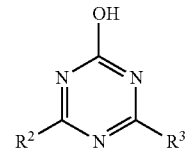

wherein, $R^2$ and $R^3$ each independently represent an amino group or a hydroxyl group.

2. The active energy ray-curable inkjet ink according to claim 1, wherein the active energy ray-polymerizable compound (A) further contains a compound (A-2) selected from the group consisting of polypropylene glycol di(meth)acrylate and alkanediol di(meth)acrylate.

3. The active energy ray-curable inkjet ink according to claim 1, wherein an amount of the compound (A-1) represented by general formula 1 is 10 to 90% by mass of a total amount of the active energy ray-curable inkjet ink.

4. The active energy ray-curable inkjet ink according to claim 2, wherein an amount of the compound (A-1) represented by general formula 1 is 10 to 90% by mass of a total amount of the active energy ray-curable inkjet ink.

5. A printed matter obtained using the active energy ray-curable inkjet ink according to claim 1.

* * * * *